US012660944B1

(12) United States Patent
Lawlor et al.

(10) Patent No.: US 12,660,944 B1
(45) Date of Patent: Jun. 23, 2026

(54) HEIGHT ADJUSTABLE DIAPER CHANGING STATION

(71) Applicant: Foundations Worldwide, Inc., Medina, OH (US)

(72) Inventors: Joseph A. Lawlor, Medina, OH (US); Casey R. Getic, Stow, OH (US); David Stitchick, Wadsworth, OH (US); Jonah Pamula, Cuyahoga Falls, OH (US); Nathaniel Matyas, Strongsville, OH (US)

(73) Assignee: FOUNDATIONS WORLDWIDE, INC., Medina, OH (US)

( * ) Notice: Subject to any disclaimer, the term of this patent is extended or adjusted under 35 U.S.C. 154(b) by 93 days.

(21) Appl. No.: 18/903,417

(22) Filed: Oct. 1, 2024

Related U.S. Application Data

(60) Provisional application No. 63/544,557, filed on Oct. 17, 2023.

(51) Int. Cl.
*A47D 5/00* (2006.01)
*F16M 13/02* (2006.01)

(52) U.S. Cl.
CPC ............. *A47D 5/003* (2013.01); *A47D 5/006* (2013.01); *F16M 13/02* (2013.01)

(58) Field of Classification Search
CPC ...... A47D 5/003; A47D 5/006; A61G 7/1019; A61G 7/0005
See application file for complete search history.

(56) References Cited

U.S. PATENT DOCUMENTS

| | | | | |
|---|---|---|---|---|
| 5,086,527 | A | * | 2/1992 | Takahashi .............. A47D 5/003 108/42 |
| 6,055,688 | A | * | 5/2000 | Helmsderfer .......... A47D 5/003 5/655 |
| 7,131,155 | B1 | * | 11/2006 | Fernandez ............. A47D 5/003 5/655 |
| 11,350,763 | B1 | * | 6/2022 | Stitchick ................ A47D 5/003 |
| 11,910,935 | B1 | * | 2/2024 | Lawlor .................. A47D 5/003 |
| 2014/0201920 | A1 | * | 7/2014 | Gant ...................... A47D 5/006 5/655 |
| 2019/0174978 | A1 | * | 6/2019 | Bongiorno ............. F16M 11/10 |
| 2022/0061547 | A1 | * | 3/2022 | Colebrook ........... A61G 7/1019 |

FOREIGN PATENT DOCUMENTS

| | | | | |
|---|---|---|---|---|
| DE | 20306952 U1 | * | 9/2003 | ............. A47D 5/003 |
| GB | 2401541 A | * | 11/2004 | .............. A61G 1/06 |
| GB | 2600999 A | * | 5/2022 | ............. A47D 5/006 |

\* cited by examiner

*Primary Examiner* — Eric J Kurilla

(74) *Attorney, Agent, or Firm* — Ralph E. Jocke; WALKER & JOCKE

(57) ABSTRACT

A height adjustable diaper changing station (10) includes an upright portion (12) and a selectively vertically movable table (22). The exemplary changing station is configured to be mounted in fixed connection with a horizontally extending floor (18) and a vertically extending building wall (14). The exemplary table is rotatably movably mounted in connection with a carriage (64) that is selectively vertically movable. The table is rotatably movable between a use position and the stored position. The exemplary changing station is suitable for supporting adult individuals. At least one control circuit (114) that enables the user of the changing station to readily adjust the height of the changing table and to perform other functions.

28 Claims, 28 Drawing Sheets

HEIGHT ADJUSTABLE DIAPER CHANGING STATION

TECHNICAL FIELD

Exemplary arrangements relate to diaper changing stations. Further exemplary arrangements relate to a height adjustable diaper changing station which may be used for supporting and selectively vertically positioning a person for purposes of changing a diaper or other activity.

BACKGROUND

Diaper changing stations that are publicly available are commonly made to be used for changing diapers on small children. Such diaper changing stations are commonly positioned at a fixed height.

However there is also a need to provide diaper changing stations for adults. Such diaper changing stations need the capabilities to support greater weight and also require the capability to be selectively adjustable in height. Such adult diaper changing stations also need to be larger than those used for children, but should not occupy excessive space particularly when not in use.

Existing diaper changing stations may benefit from improvements.

SUMMARY

Exemplary arrangements relate to a height adjustable diaper changing station that is configured for use by adults. Exemplary arrangements provide suitable weight bearing capability and are adjustable in height as needed for both enabling the individual to mount and dismount from the changing table. The ability to raise the table to a selected height to facilitate diaper changing or other activity is also provided.

Exemplary arrangements also provide safety features to prevent a person from falling off the table and to otherwise minimize the risk of being injured. Secure and safe mounting is also provided in a variety of suitable locations. Exemplary arrangements further include features to assure durability and reliability of operation. Compact storage when the changing station is not in use is also provided.

Numerous additional useful features and relationships are described in the following Detailed Description and are represented in the appended drawings.

DETAILED DESCRIPTION

Figure 1:
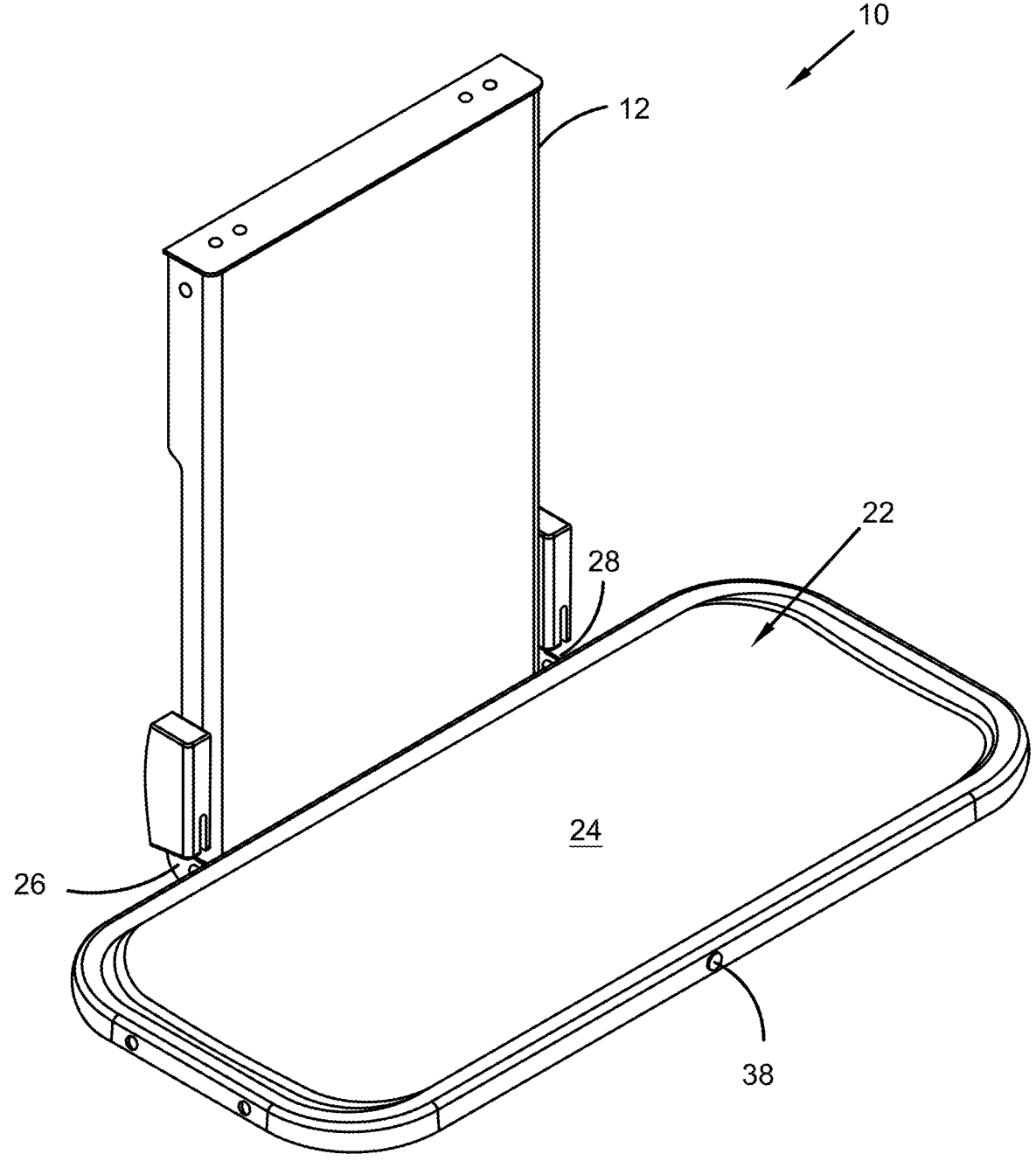
FIG. 1 is a top front right perspective view of an exemplary height adjustable diaper changing station with the table in a lowered use position.
Figure 2:
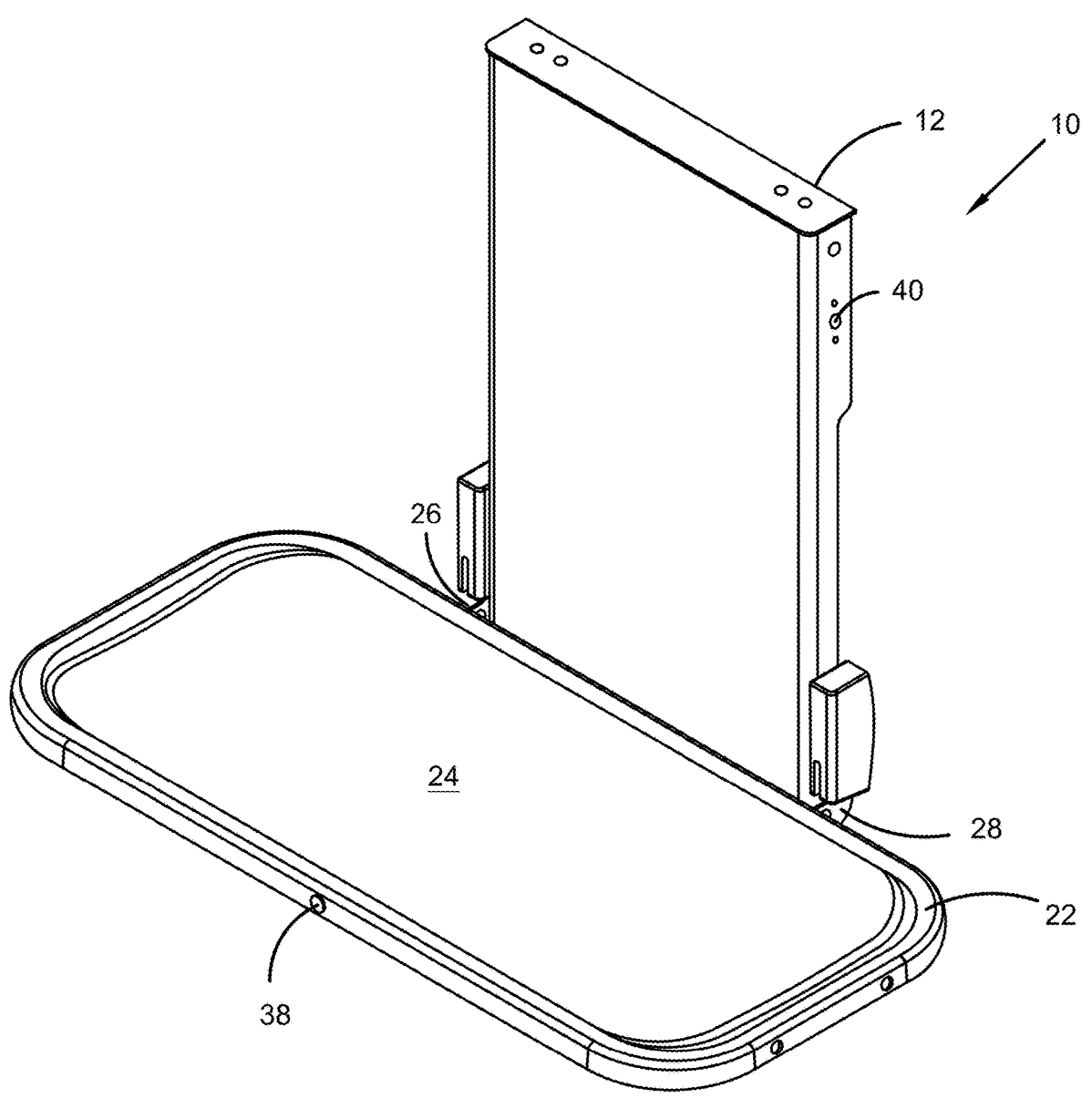
FIG. 2 is a top front left perspective view of the changing station.
Figure 3:
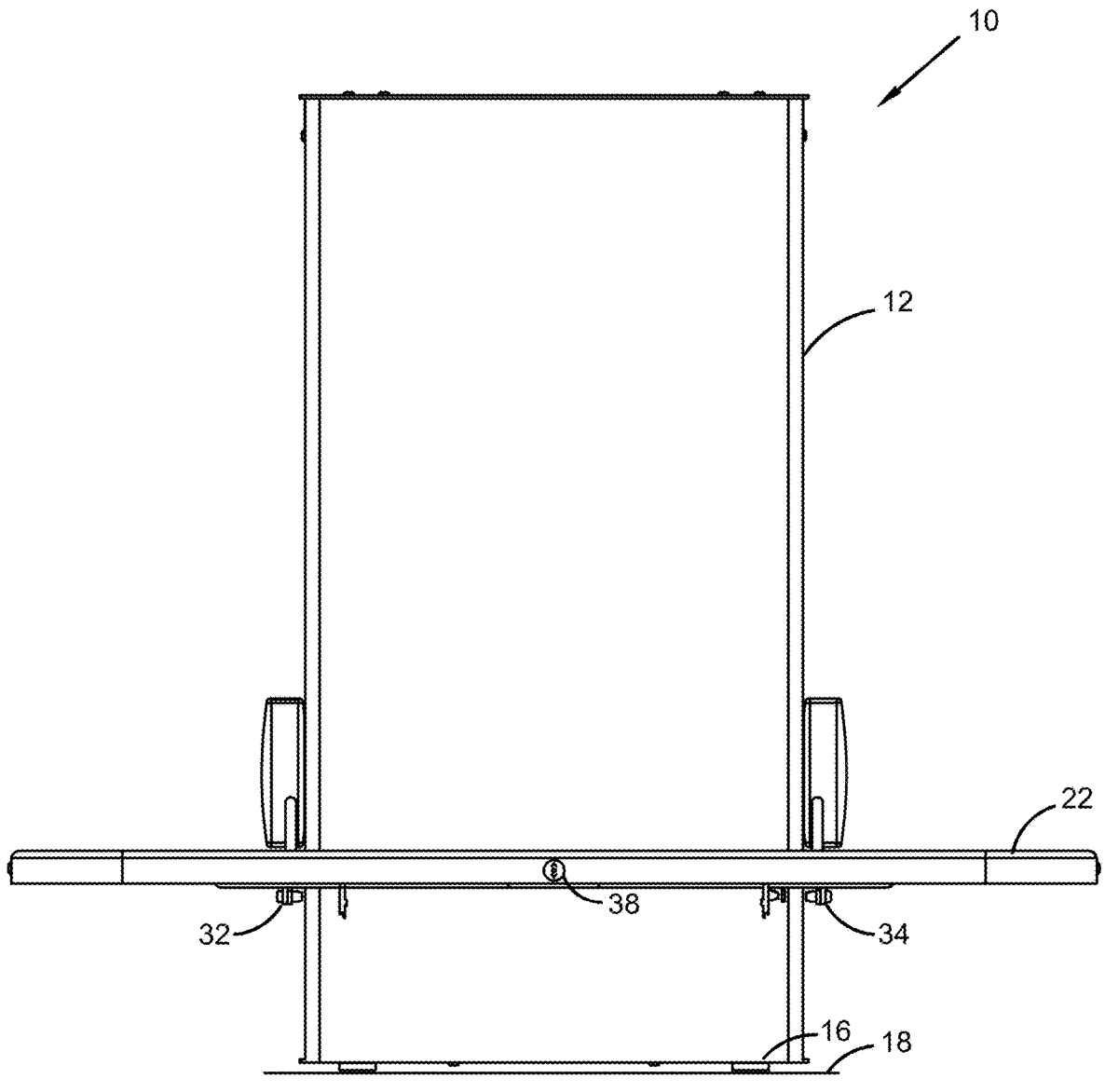
FIG. 3 is a front view of the changing station.
Figure 4:
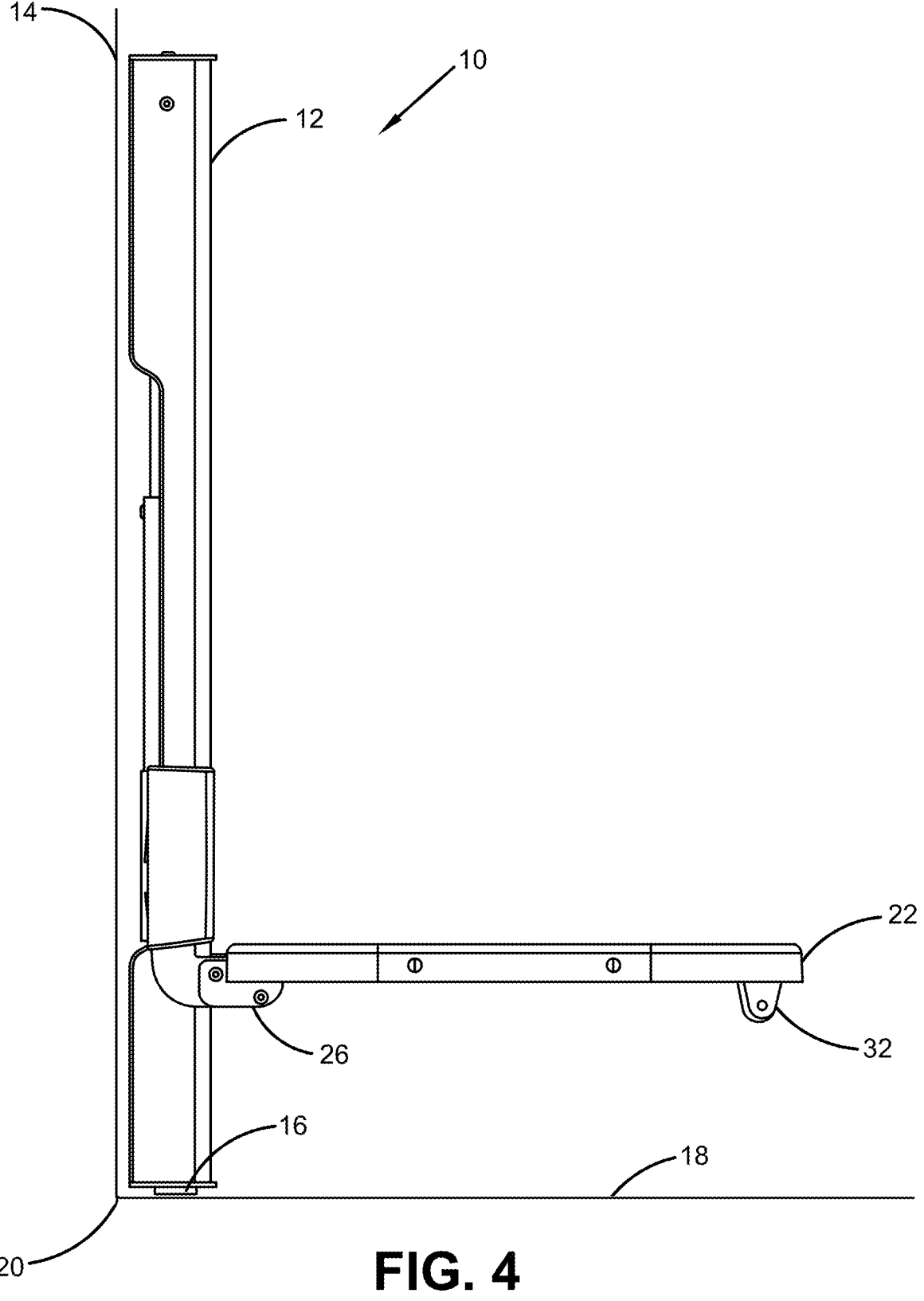
FIG. 4 is a right side view of the changing station.

Referring now to the drawings and particularly to FIG. 1 there is shown therein and exemplary height adjustable diaper changing station generally indicated 10. The exemplary changing station 10 includes an upright portion 12. The exemplary upright portion 12 is generally rectangular and is configured to be positioned adjacent to a vertically extending building wall 14. Upright portion 12 includes a pair of horizontally disposed leveling feet 16. The leveling feet 16 which are height adjustable as later discussed, are configured to engage with a horizontally extending floor 18. In ways that are later discussed in detail, the exemplary changing station is configured to be positioned adjacent to an intersection 20 of the floor 18 and the vertically extending wall 14, and is configured to be operatively supported by the floor and held in attached engagement with the wall. Of course it should be understood that this supporting approach is exemplary and in other arrangements other support approaches may be used.

The exemplary changing station 10 further includes a table 22. The exemplary table includes a substantially planar changing surface 24 which faces upward in the use position of the table as shown in FIG. 1. The exemplary table is movably rotationally mounted in connection with an internal carriage which is selectively vertically positionable within the upright portion 12 in a manner later discussed. The exemplary table is rotationally movable through connections 26, 28 that are positioned on opposed horizontal sides of the upright portion 12 and which are later described in detail.

Figure 11:
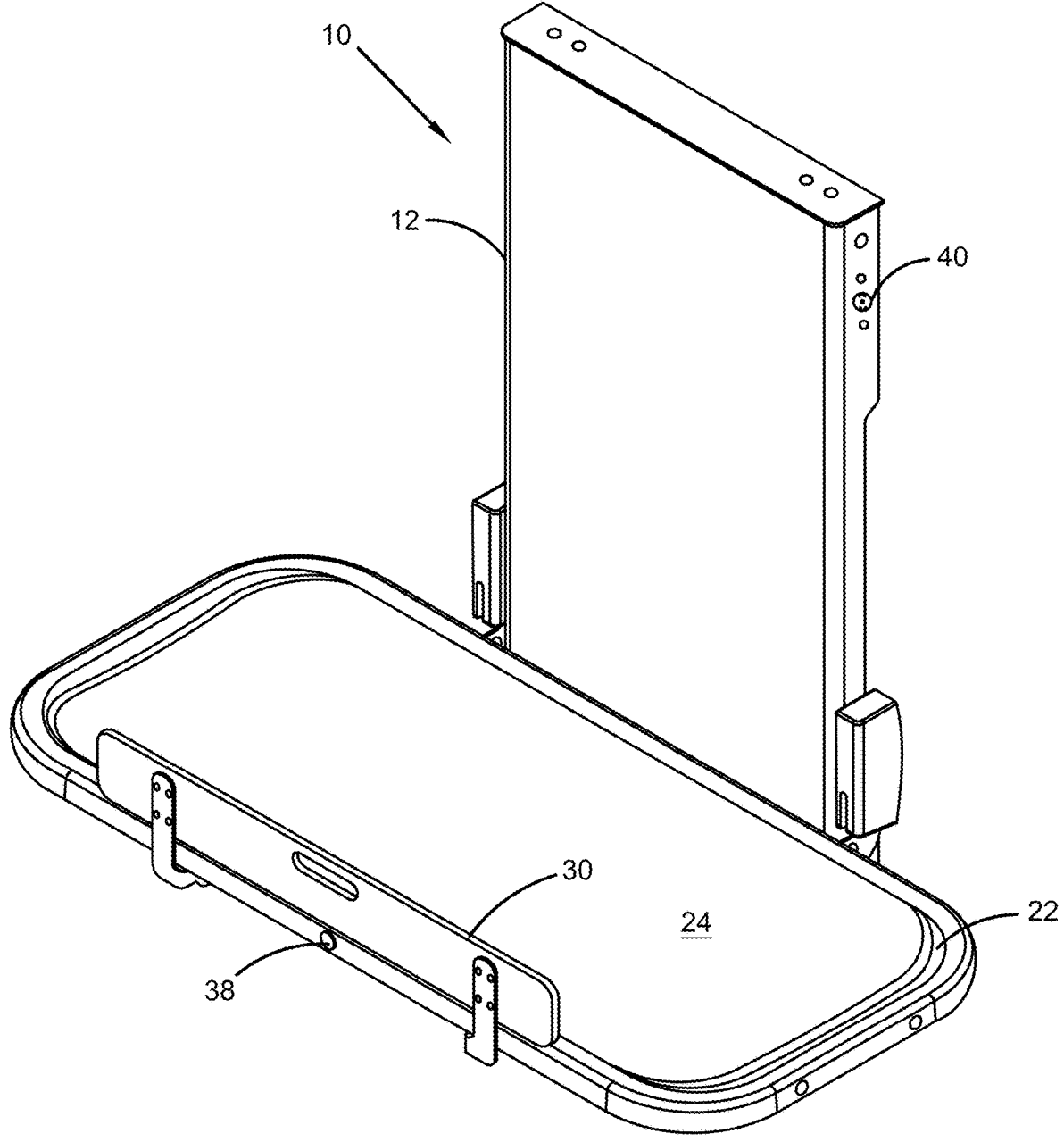
FIG. 11 is a top front right perspective view of the exemplary changing station with the table in the use position and the safety barrier shown in the extended position.
Figure 12:
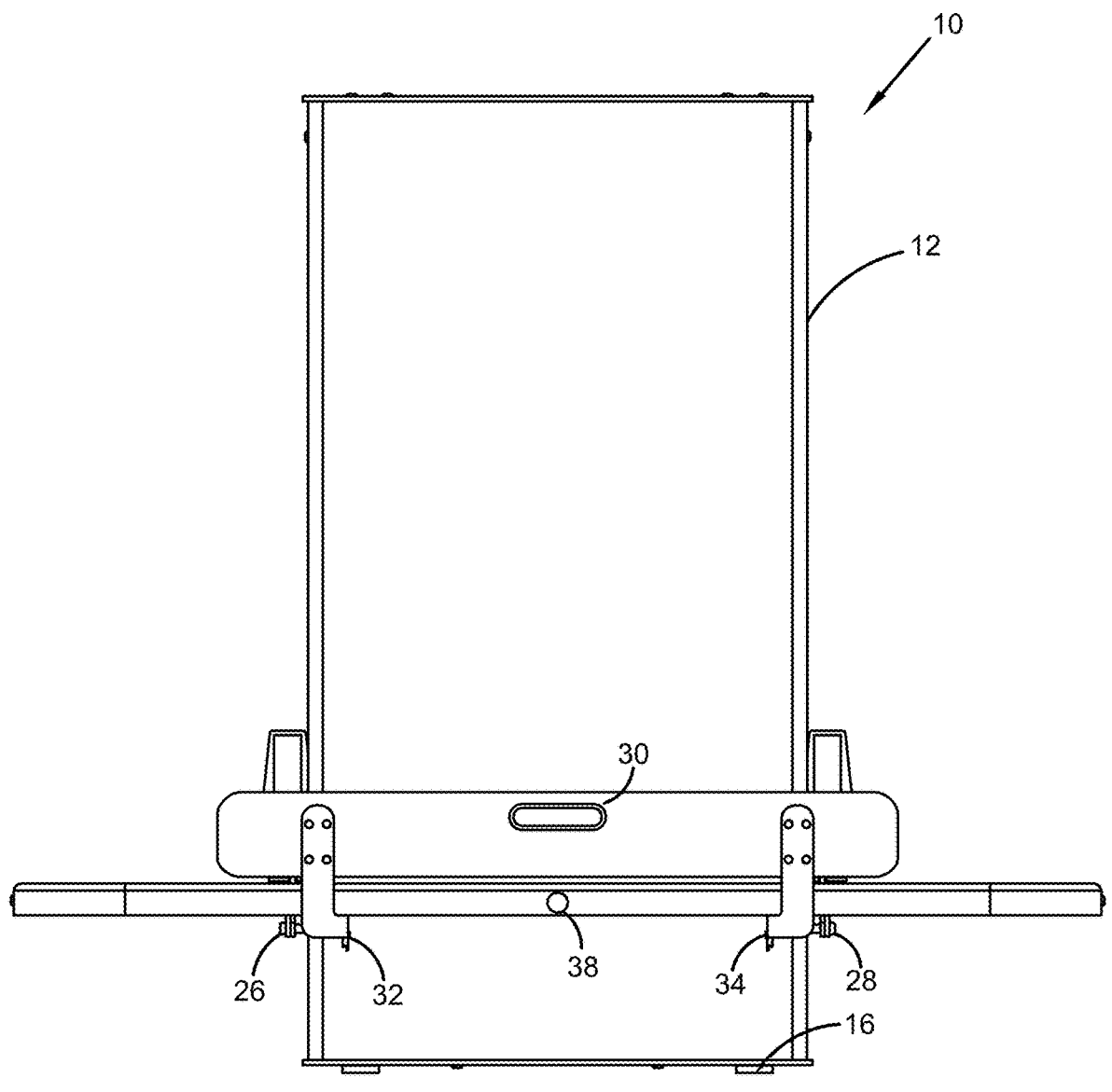
FIG. 12 is a front view of the changing station in the configuration shown in FIG. 11.

The exemplary table has in manually movable connection therewith a safety barrier 30. The exemplary safety barrier is rotationally movably mounted in operative connection with the table 22. The safety barrier is rotationally movably mounted to the table via a pair of horizontally disposed hinges 32, 34. The exemplary hinges enable the safety barrier 30 to be manually moved when the table is in the use position between a retracted position and an extended position. In the retracted position as shown in FIGS. 1-4 the exemplary safety barrier is positioned below the changing surface 24. In the extended position as shown in FIGS. 11 and 12 the safety barrier extends above the changing surface 24.

In the exemplary arrangement hinges 32, 34 are in operative connection with at least one detent 36. In the exemplary arrangement the at least one detent comprises a spring-loaded member such as a ball or projection that enables releasably holding the safety barrier in at least one of the extended position and the retracted position. In exemplary arrangements the at least one detent 36 is operative to hold the safety barrier in each of the extended position and the retracted position while enabling a user to manually disengage the detent and move the safety barrier between the respective positions. Of course it should be understood that these approaches are exemplary and in other arrangements other holding approaches may be used.

Figure 22:
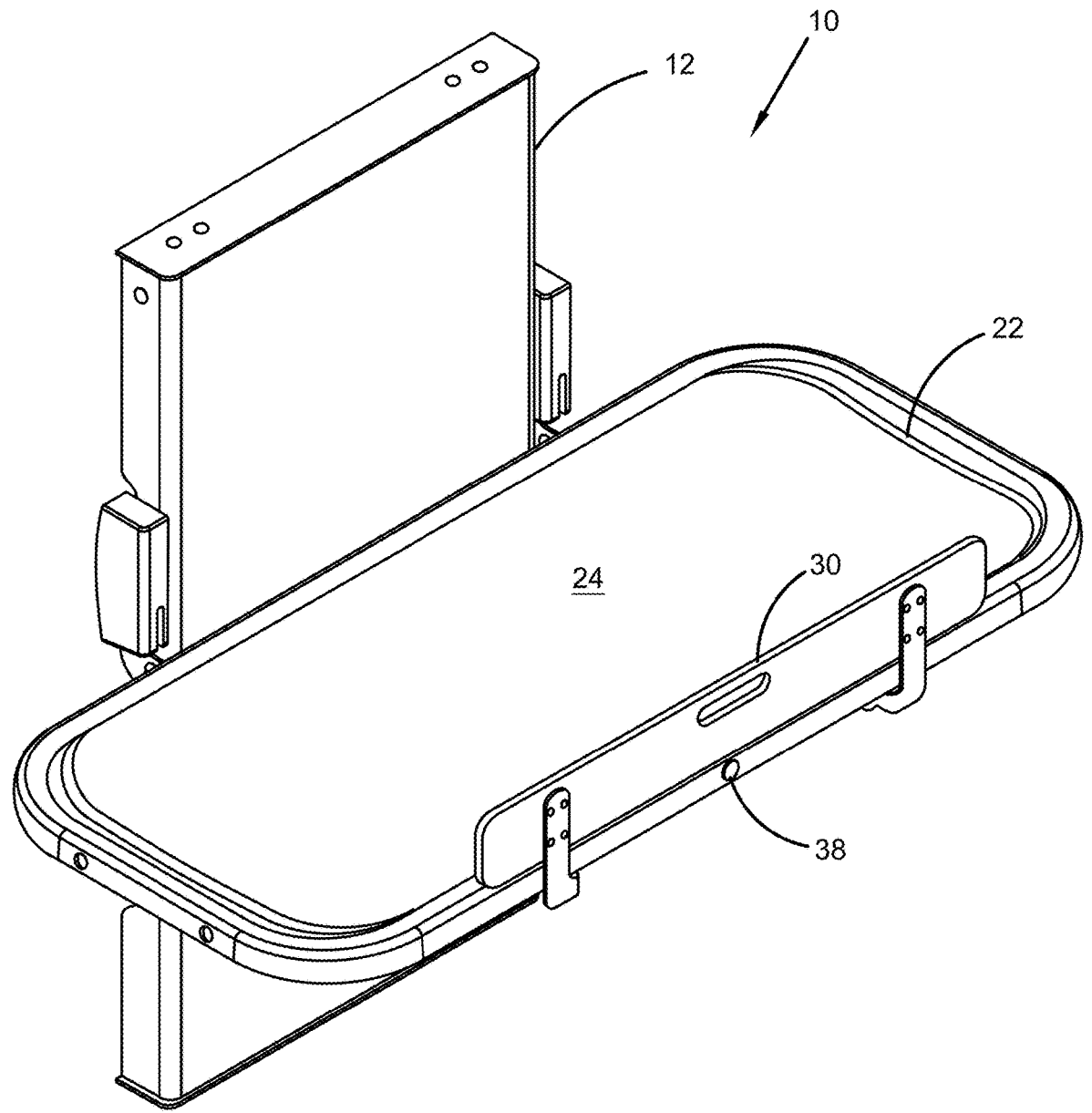
FIG. 22 is a top front right perspective view of the exemplary changing station with the table position in a raised use position.
Figure 23:
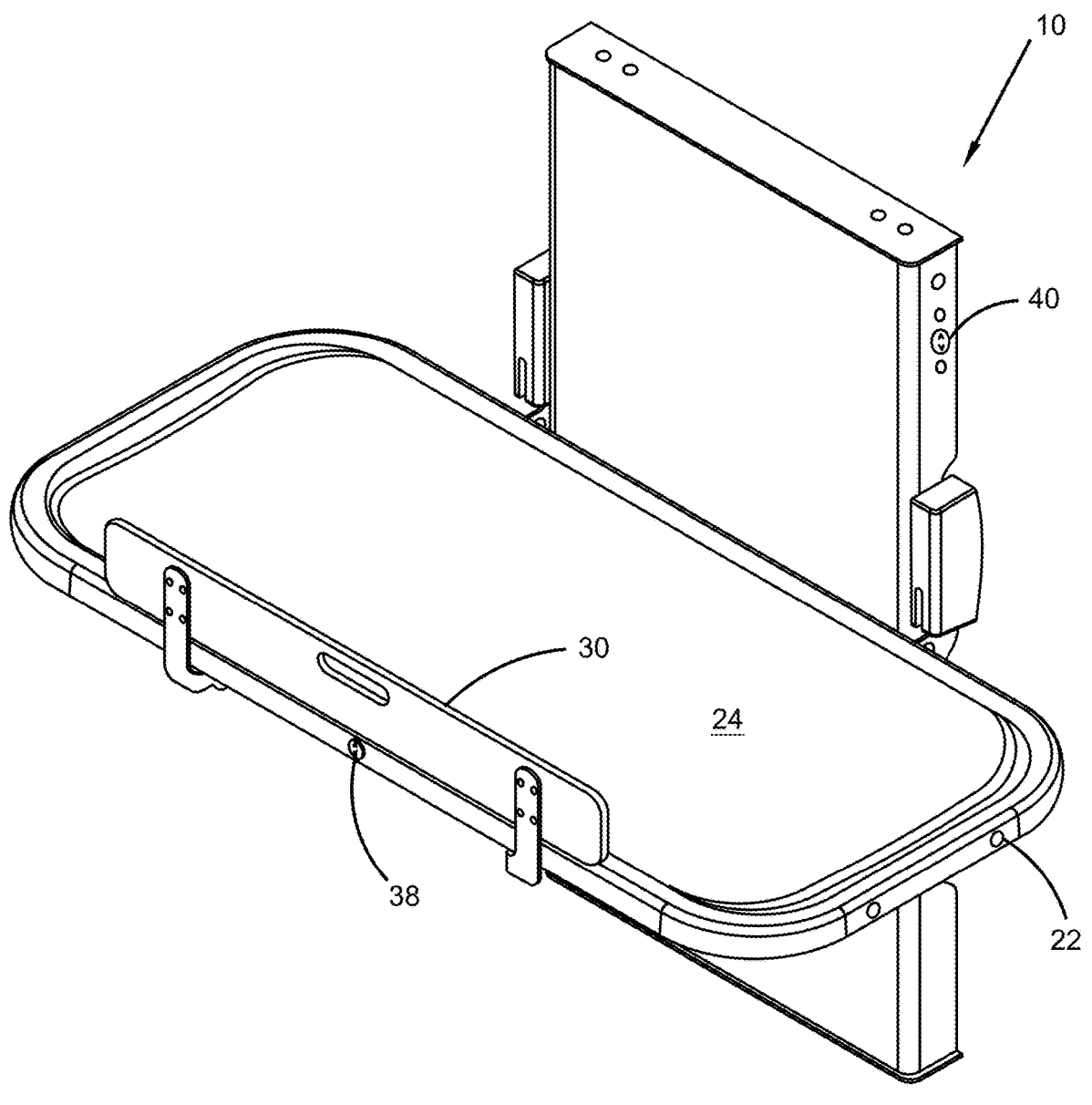
FIG. 23 is a top front left perspective view of the exemplary changing station in the configuration shown in FIG. 22.
Figure 24:
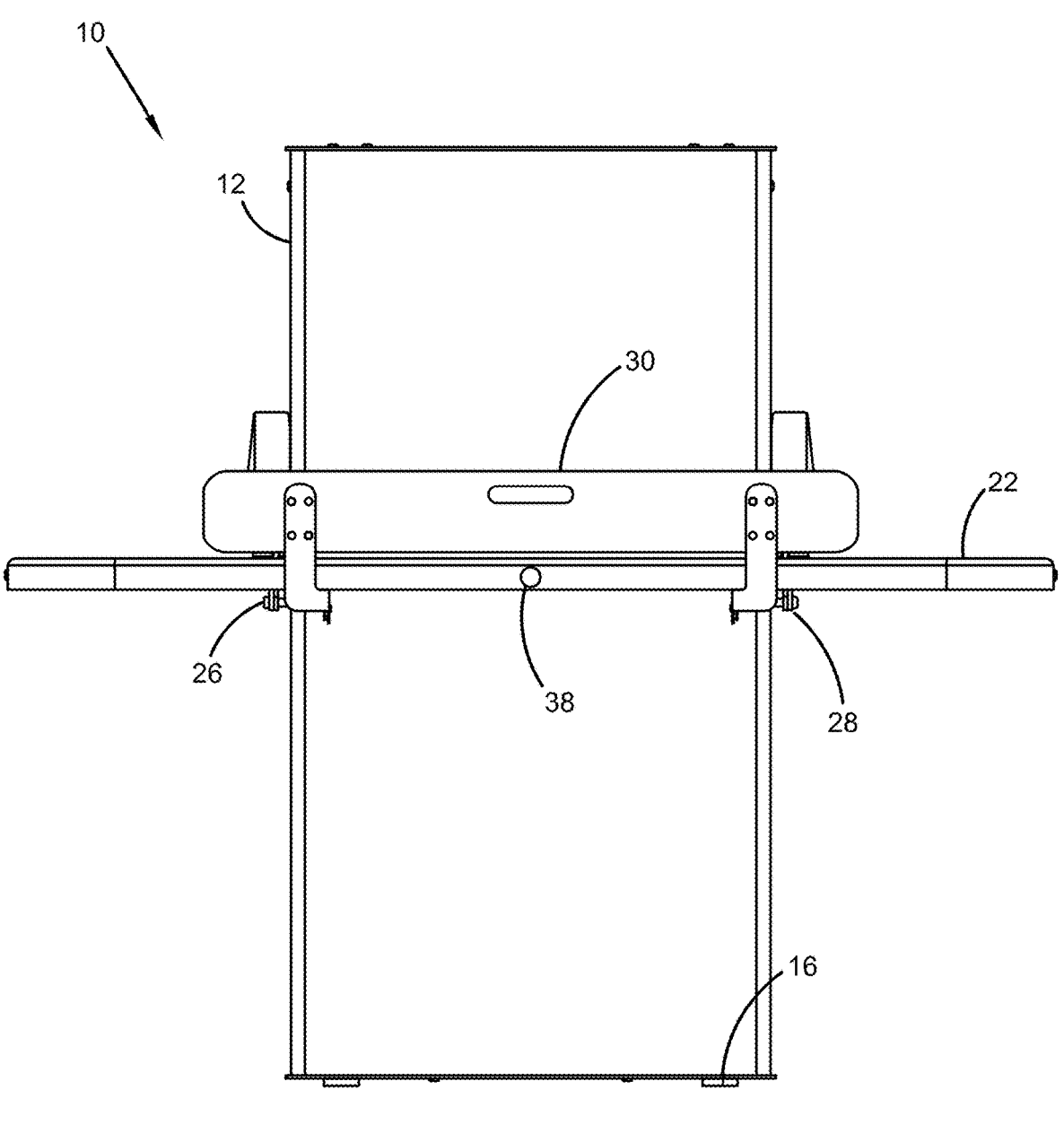
FIG. 24 is a front view of the exemplary changing station in the configuration shown in FIG. 22.
Figure 25:
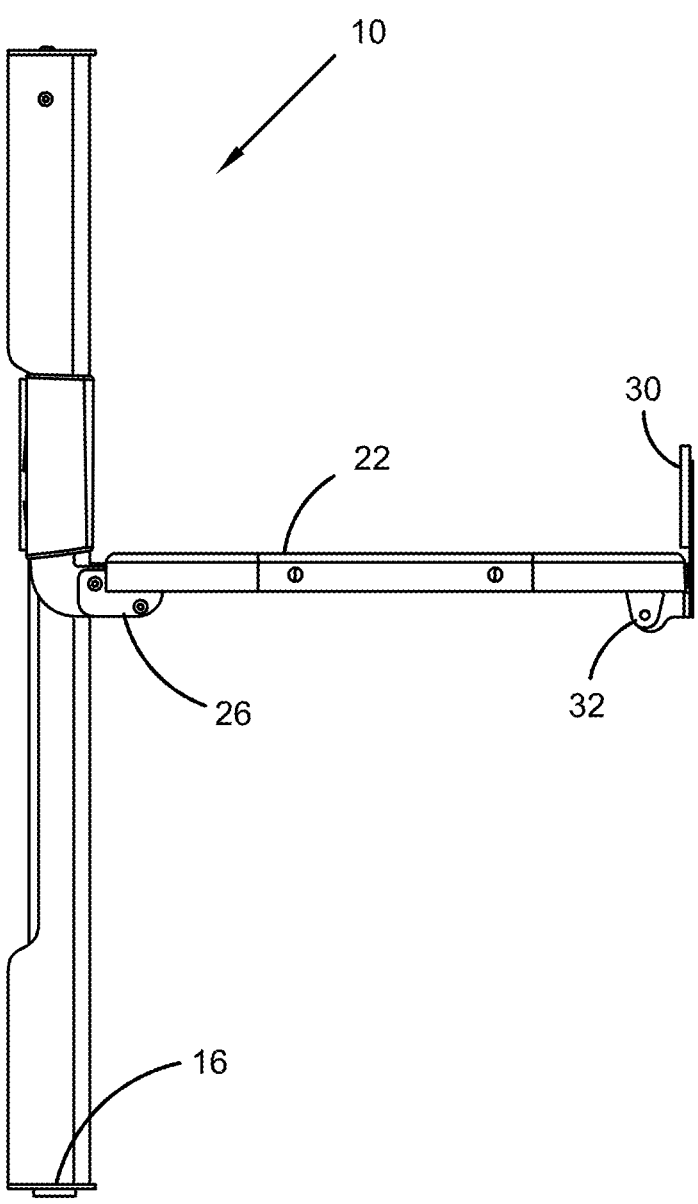
FIG. 25 is a right side view of the changing station in the configuration shown in FIG. 22.
Figure 26:
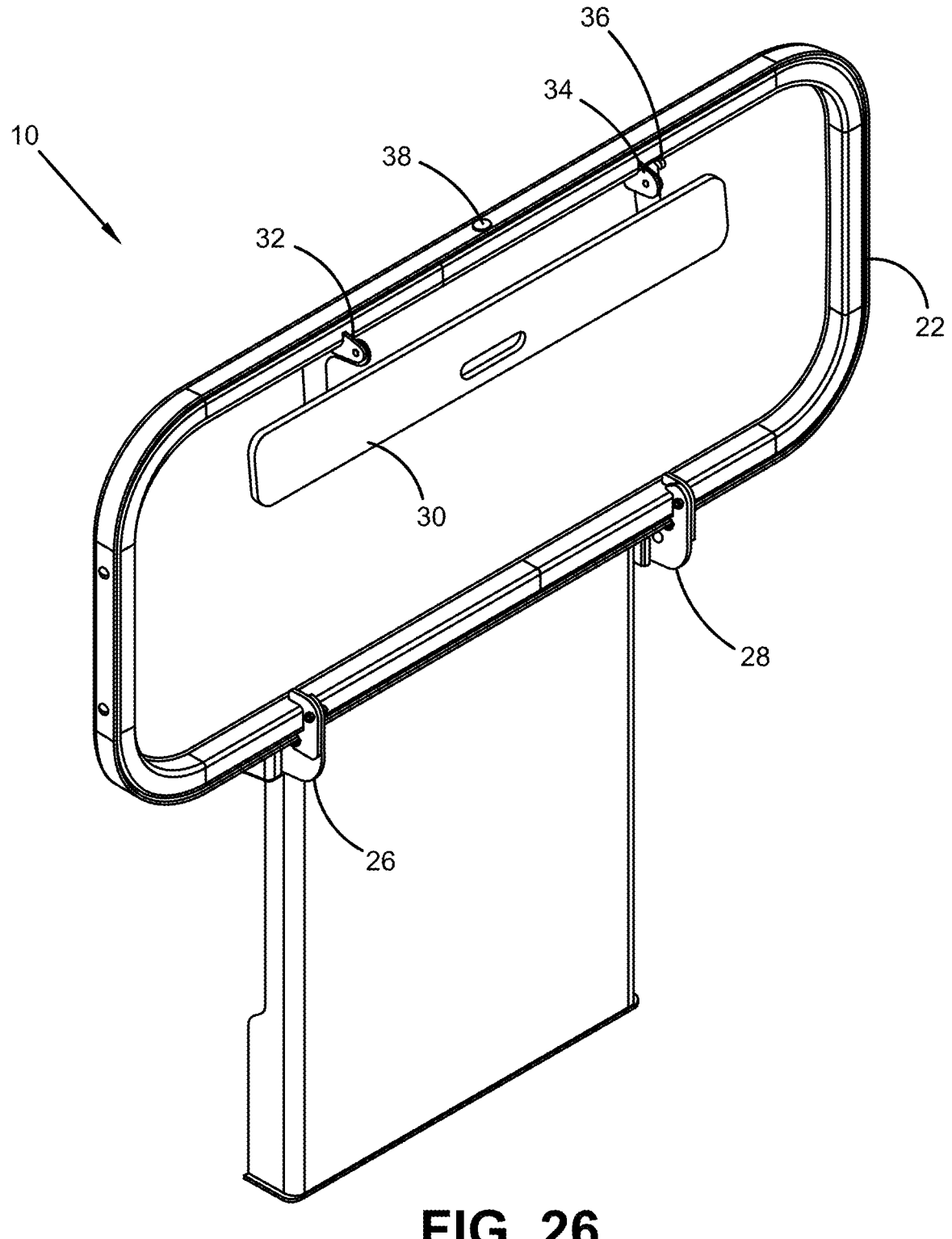
FIG. 26 is a top front right perspective view of the exemplary changing station with the table in the raised and storage position.
Figure 27:
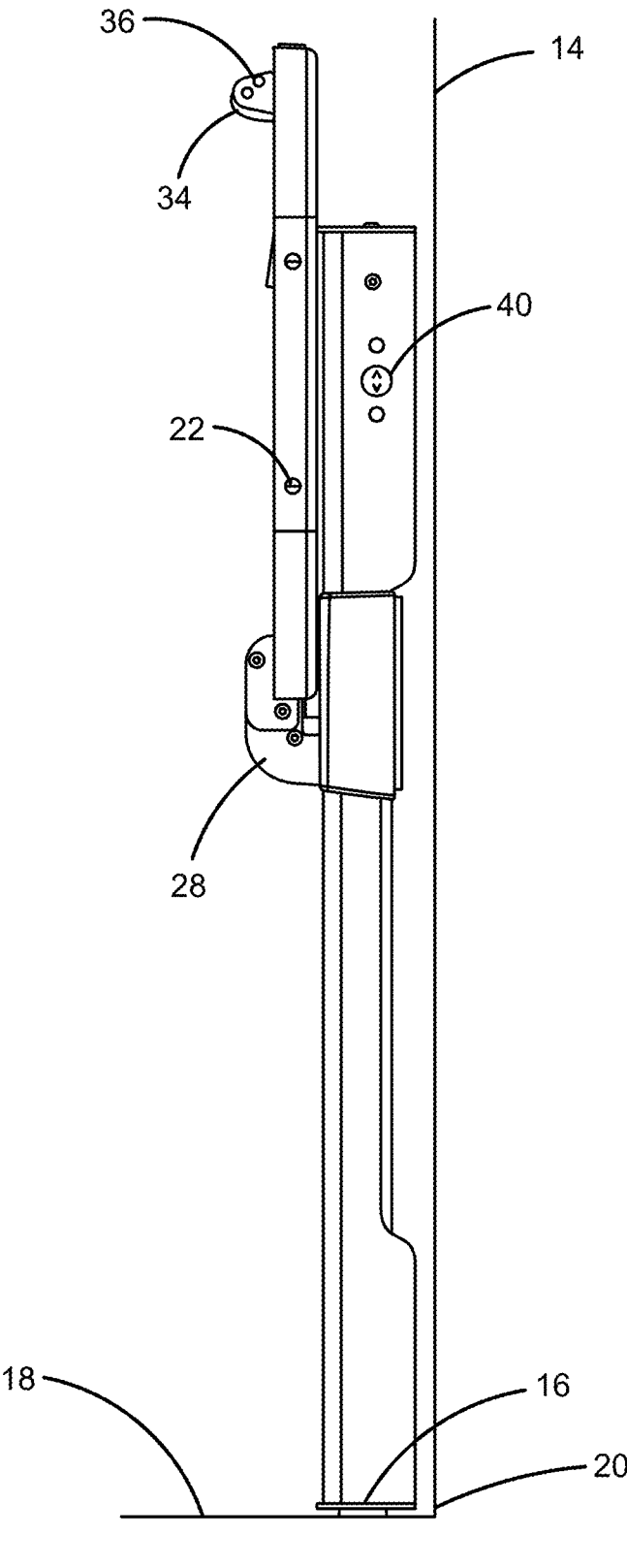
FIG. 27 is a right side view of the changing station shown in the configuration of FIG. 26.

In the exemplary arrangement the vertical position of the changing table is selectively changeable responsive to user inputs to at least one input device. In the exemplary arrangement the input devices include a first input device 38 that is positioned on the changing table. The exemplary first input device 38 includes at least one manually actuatable switch. The exemplary first input device enables the user to move the table in an upward direction by pressing inward on a first side of the switch and in a downward direction by pressing inward on opposed side of the switch. By pressing on the exemplary switch the user is enabled to adjust the height of the table of the changing station anywhere between the lower position such as is shown in FIG. 1 and the fully raised position such as is shown in FIG. 22.

Figure 5:
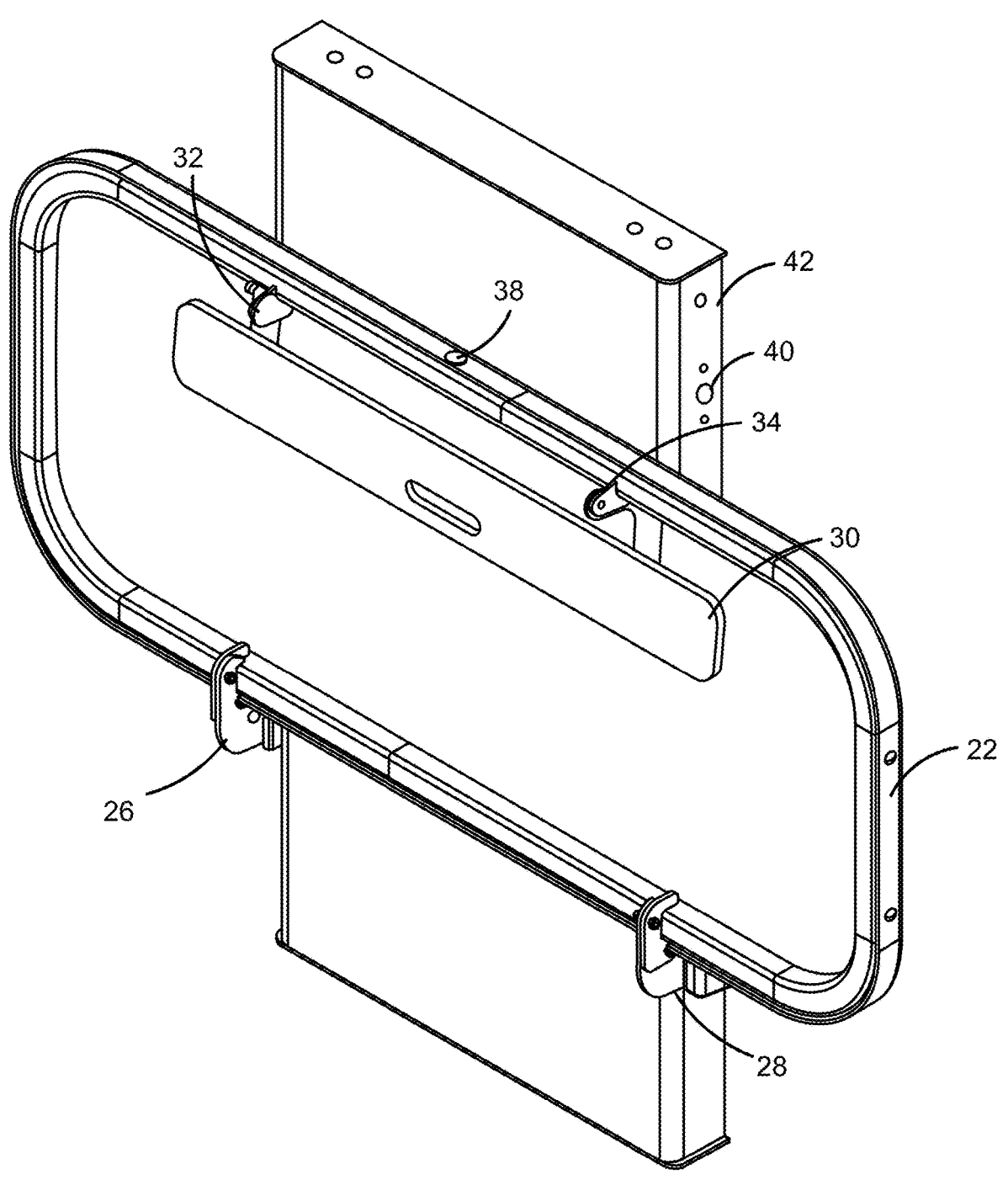
FIG. 5 is a top front right perspective view of the changing station of FIG. 1 but with the table moved to a storage position.
Figure 6:
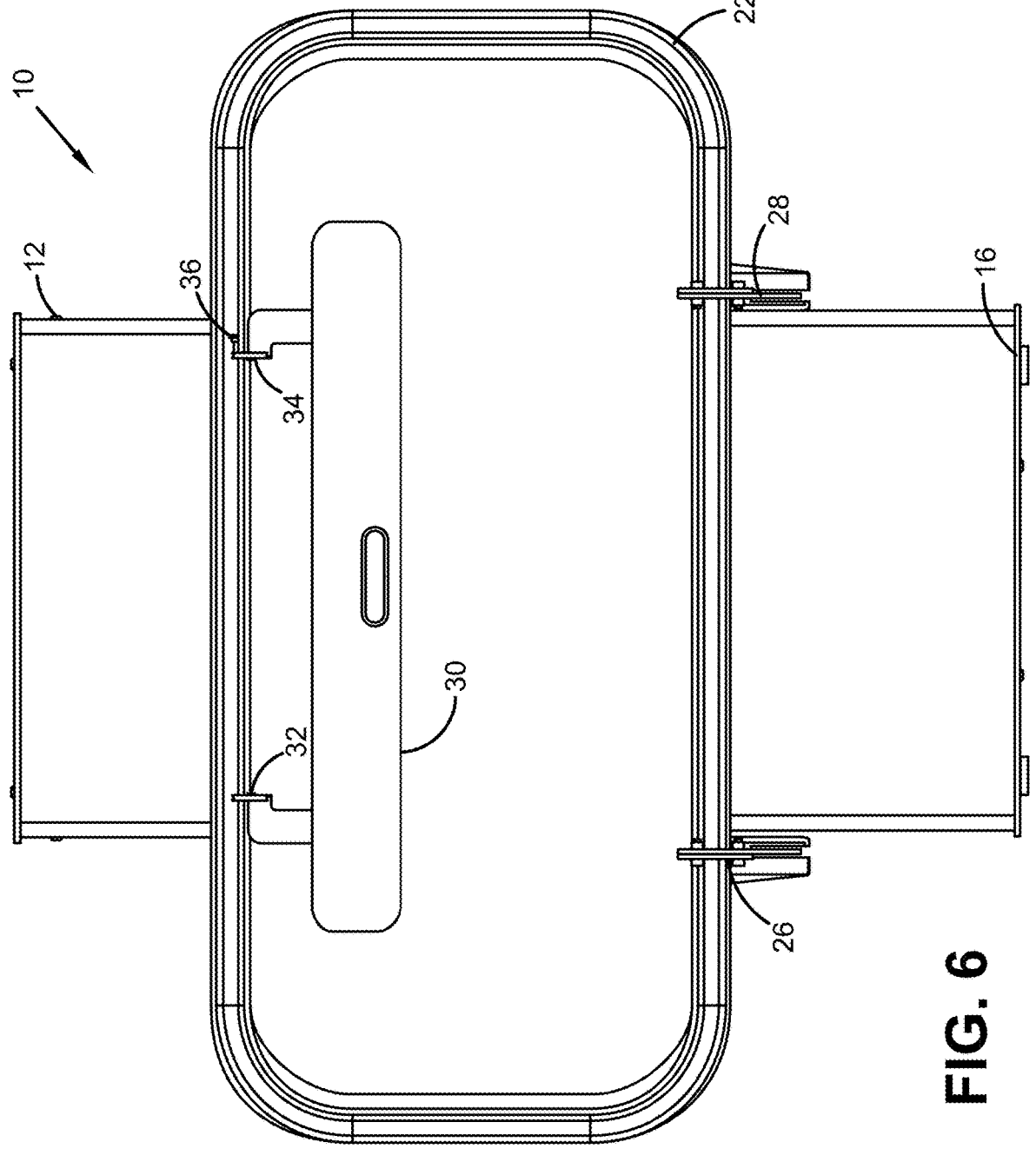
FIG. 6 is a front view of the changing station in the configuration shown in FIG. 5.
Figure 7:
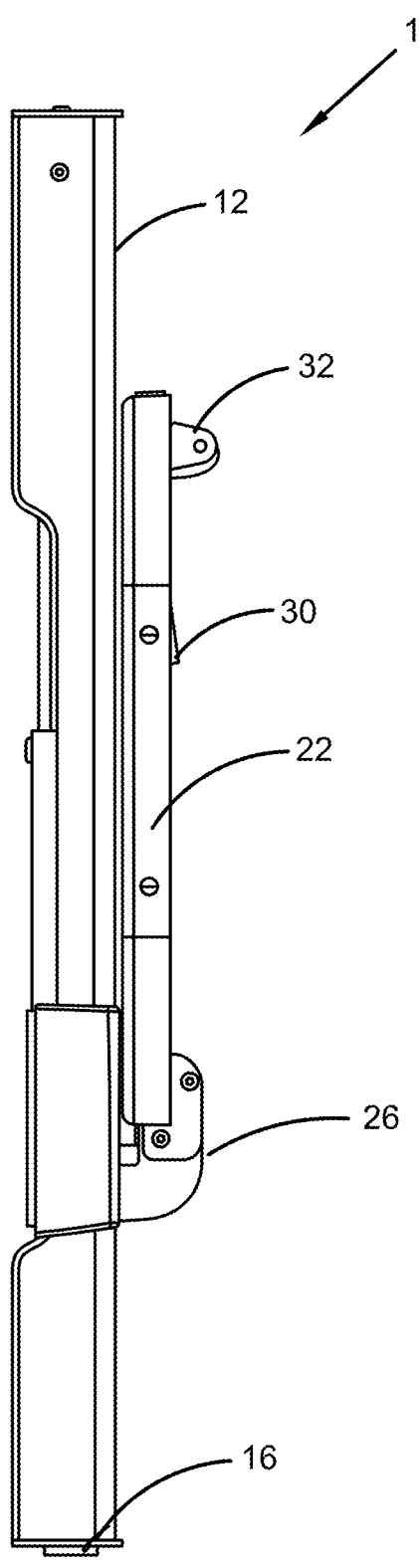
FIG. 7 is a right side view of the changing station as shown in FIG. 5.
Figure 8:
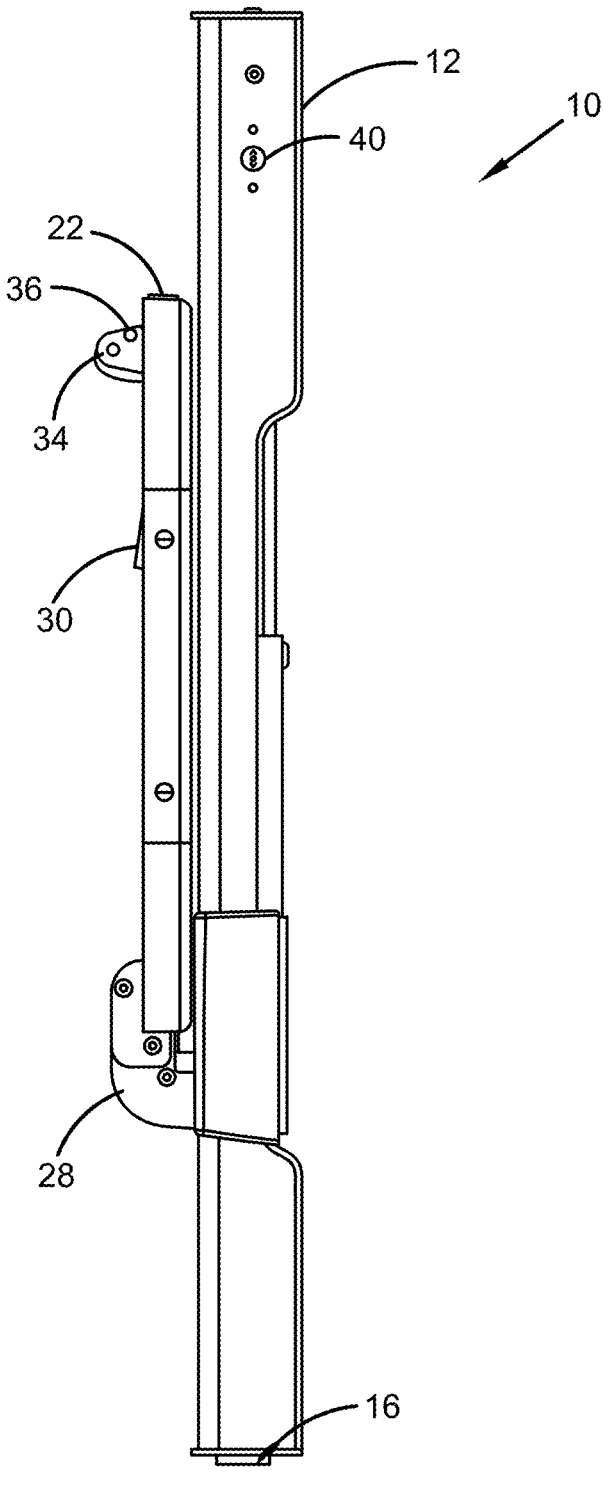
FIG. 8 is a left side view of the changing station as shown in FIG. 5.
Figure 9:
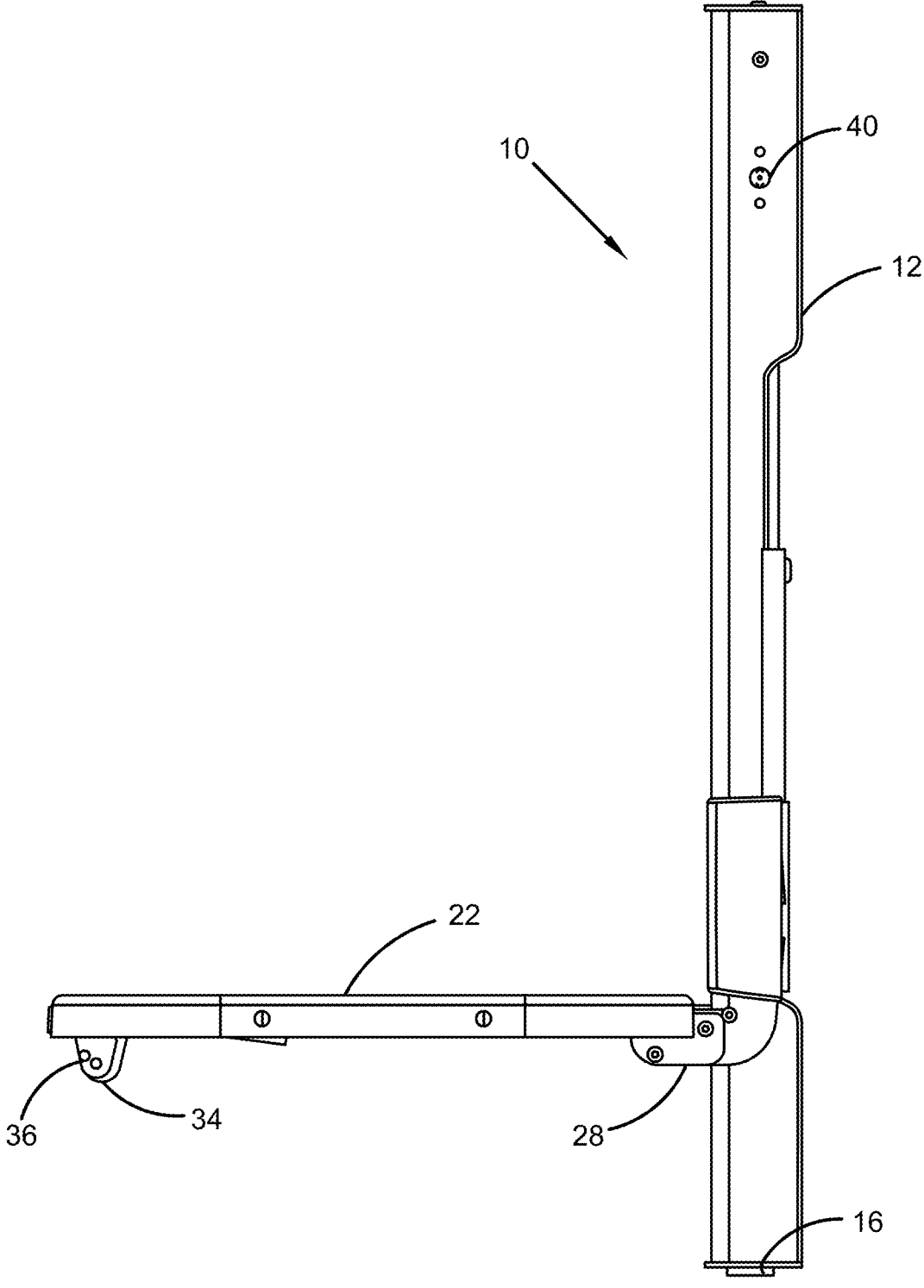
FIG. 9 is a right side view of the changing station with the table in the use position and with the safety barrier shown in the retracted position.
Figure 10:
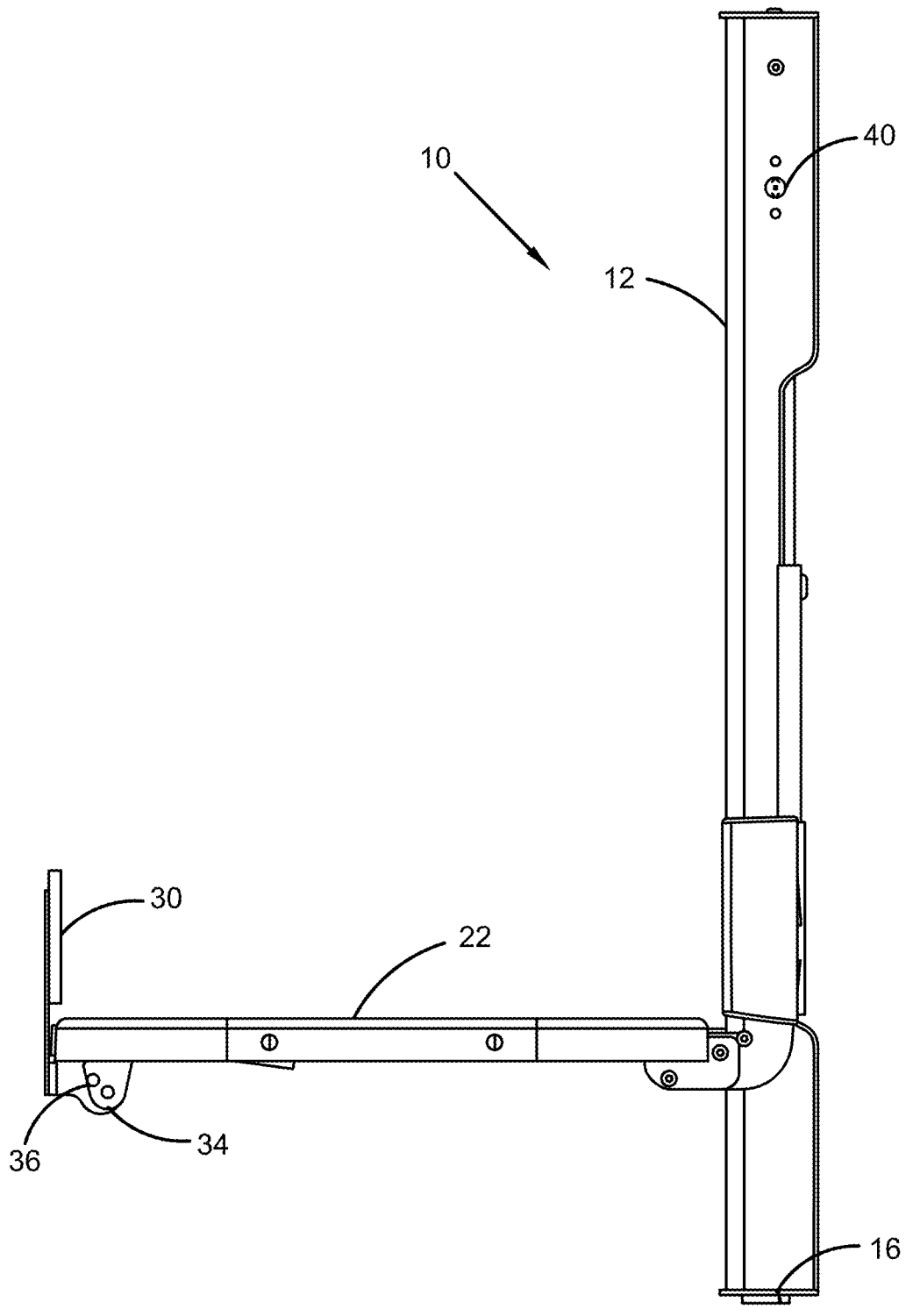
FIG. 10 is a view similar to FIG. 9 but with the safety barrier shown in an extended position.

The exemplary changing station further includes an input device 40. The exemplary input device 40 extends on a stationary cover that is positioned on the right-hand side of the upright portion 12. The exemplary input device 40 may be operable to raise and lower the table similar to the manual input device 38. The exemplary input device 40 facilitates the ability to raise and lower the table by a person who may find it inconvenient to access the input device 38. Input device 40 is also usable to to raise and lower the table when the table is in the stored position such as is shown in FIGS. 5 and 6 for example.

Of course it should be understood that these input devices are exemplary and in other arrangements other devices for controlling the position and other aspects of the changing station may be utilized. For example as later discussed, exemplary arrangements of the changing station may include at least one control circuit with a wireless transceiver that enables control of functions of the changing station through wireless signals that may be provided by a smart phone or similar device. Numerous features and capabilities may be provided in different exemplary arrangements.

The exemplary structures that underlie the external covers of the changing station are shown in FIGS. 13-20. In the exemplary arrangement the station includes a footer. The exemplary footer serves as a base for the apparatus. The exemplary footer extends horizontally adjacent to the intersection 20 of the floor 18 and the vertically extending building wall 14. The exemplary footer is vertically supported by operative engagement with the floor 16 through the horizontally disposed leveling feet 16. In exemplary arrangements the leveling feet 16 are selectively vertically positionable through a threaded engagement with the footer. This enables the vertical position of the upright portion as well as the vertical alignment of the upright portion 12 to be selectively adjusted. This may be done to level the changing station and also to compensate for the floor not being level. Further it should be understood that the exemplary leveling feet 16 are sufficiently sized and horizontally disposed so as to provide a stable support for the changing station and the additional weight of users who may be positioned thereon.

The exemplary footer 44 is configured to be fixed in operative connection with at least one of the floor 18 and the vertically extending building wall 14. The exemplary footer 44 includes a plurality of horizontally disposed fastener engaging openings 46. The exemplary openings are configured to receive therein respective fasteners 48. The respective fasteners 48 are configured to secure the footer in abutting engagement with the wall 14. Of course it should be understood that this arrangement of the footer and the approach to securing the footer are exemplary, and in other arrangements other approaches may be used.

The exemplary structure further includes a pair of guide rods 50. A first guide end 52 of each guide rod is in fixed operative connection with the footer 44. The guide rods extend vertically and in parallel spaced relation. The guide rods are spaced apart horizontally by a guide space distance which in the exemplary arrangement corresponds to a majority of the length of the footer. The exemplary guide rods 50 are circular in horizontal transverse cross-section. However in other arrangements other guide rod configurations may be used.

A header 54 vertically overlies the footer 44. The exemplary header serves as a top mounting structure for engaging the changing station with the adjacent building wall. A second guide end 56 of each respective guide rod is in fixed operative connection with the header 54. The exemplary header 54 extends horizontally and is in attached connection with the vertically extending building wall 14. The exemplary header extends horizontally on each transverse side beyond the guide rods. In the exemplary arrangement the header comprises a C-shaped channel. The channel includes a back channel wall 58 which is configured to be in abutting engagement with the building wall. The back channel wall includes a plurality of horizontally spaced fastener accepting openings 60 therein. The fastener accepting openings are configured to receive suitable fasteners 62 therein. The fasteners 60 enable the header 54 to be held in fixed engagement with the building wall 14. In exemplary arrangements the fastener accepting openings 60 are suitably spaced so that the fasteners may be engaged with a suitable wall stud or other supporting member that is within an adjacent wall. Of course this approach is exemplary and in other arrangements other approaches may be used.

The exemplary structure further includes a movable carriage 64. The exemplary carriage is configured to move vertically in guided relation with the guide rods 50. The exemplary carriage includes a pair of horizontally spaced guide sleeves 66. Each guide sleeve extends in surrounding engaged movable relation with the respective guide rod. Each guide sleeve 66 includes a top end 68 and a bottom end 70. A top member 72 extends horizontally intermediate and is in fixed operative connection with the top ends 68 of each guide sleeve 66.

The carriage 64 further includes a bottom member 74. The exemplary bottom member extends vertically below the top member 72 and horizontally intermediate of the guide sleeves 66. The bottom member 74 is in fixed operative connection with the respective bottom end 70 of each guide sleeve. The exemplary bottom member is in fixed attached connection with each guide sleeve at an outer circumference thereof. The exemplary bottom member further includes a central recess 76 that extends intermediate of the guide sleeves 66.

In the exemplary arrangement the guide sleeves 66 have a vertical span distance which is greater than the guide space distance between the guide rods 50. As used herein the vertical span distance refers to a distance between the location of operative engagement between each respective guide sleeve at the top end 68 and the location of operative engagement between each respective guide sleeve at the bottom end 70. In some exemplary arrangements the location of operative engagement may be through an annular bearing or bushing that extends radially intermediate of the guide rods and an internal surface of the guide sleeves. Such a bearing or bushing may extend continuously along the entire vertical span distance which substantially corresponds to the vertical length of each guide sleeve 66. However in other exemplary arrangements discrete bushings or annular bearings may be positioned in spaced apart vertical relation within each guide sleeve. When such discrete bushings or bearing elements are used the vertical span distance as used herein refers to the distance between a location of the top of the highest bushing or bearing and a location of the bottom of the lowest bushing or bearing. In the exemplary arrangement having the vertical span distance of the carriage greater than the guide space distance between the guide rods provides enhanced stability and greater capability for the carriage to resist twisting forces and move vertically despite the application of off-center loads on the table. Thus in the exemplary arrangements the carriage is able to move relative to the guide rods despite the loading on the table causing a twisting moment to be applied to the carriage. Of course it should be understood that this approach is exemplary and in other arrangements other approaches may be used.

The exemplary bottom member 74 includes horizontally opposed member sides 78. Each member side 78 extends horizontally outward beyond the immediately adjacent guide sleeve 66. Each member side terminates outwardly at a respective mounting arm 80. Each mounting arm extends in a direction that is normal to the vertically extending building wall 14 to which the changing station is attached. In exemplary arrangements the table is movably operatively attached to each of the respective mounting arms 80.

In the exemplary arrangement each mounting arm is in rotatable connection with the respective bracket 82. Each bracket is connected to a respective mounting arm through a pivot 84. The respective pivot may include a suitable shaft connection such as a shoulder bolt or other suitable connection. The exemplary bracket 82 which is shown in greater detail in FIG. 17 comprises a J shape bracket that includes a base portion 86 on which the pivot extends. The bracket further includes a distal portion 88. The exemplary distal portion extends below the table 22 when the table is in the use position. The distal portion 88 is in fixed connection with a frame member 90 of the table. The distal portion 88 is releasably attached in fixed connection with the base portion 86 through suitable fasteners 92. This exemplary configuration enables more readily replacing the changing table without having to disassemble other structures.

The exemplary bracket 82 further includes a stop engaging projection 94. The stop engaging projection 94 is configured to engage a stop 96 that is in fixed connection with the mounting arm 80 of the bottom member 74. The exemplary stop engaging projection 94 and stop 96 are configured to engage when the bracket 82 is rotated to a position in which the table is in the stored position. Of course it should be understood that this configuration is exemplary and other arrangements other configurations may be used.

The exemplary mounting arrangement for the table further includes respective springs 98. Each respective spring 98 is a compression spring such as a gas spring for example. Each exemplary spring extends rotatably between a mounting connection 100 on the respective mounting arm 80 and a mounting connection 102 on the respective bracket 82. In the exemplary arrangement the mounting connection 102 extends on a first radial side of the centerline of the pivot 84. The first radial side is on an opposed radial side of the pivot from the distal portion of the bracket to which the table 22 is attached. As a result in the exemplary arrangement the springs 98 operate to bias the table 22 toward the storage position.

In exemplary arrangements a configuration of the springs, brackets and table is provided so that when the table has been placed in the use position such that the table extends generally normal from the wall and the changing surface 24 faces upward, the table will remain in the use position. In the exemplary arrangement once the table has been manually displaced from the use position toward the stored position by rotating the table approximately 45°, the springs 98 operate to move the table toward the stored position and cause the table to be maintained in the stored position. Of course it should be understood that this configuration is exemplary and in other arrangements other approaches may be used.

The exemplary arrangement further includes a drive strut 104. The drive strut is selectively operative to vertically position the carriage. The exemplary drive strut 104 is selectively variable in length. The drive strut extends intermediate of the top member 72 of the carriage 64 and the footer 44. The upper end of the exemplary drive strut is attached to the top member 72 in centered relation between the guide sleeves 66 through a clevis 106. The lower end of the exemplary drive strut is in attached connection with the footer 44 through a clevis 108. However, in other arrangements the drive strut may be connected to the other members of a stationary support frame and the relatively movable carriage, such as the bottom member of the carriage.

Figure 13:
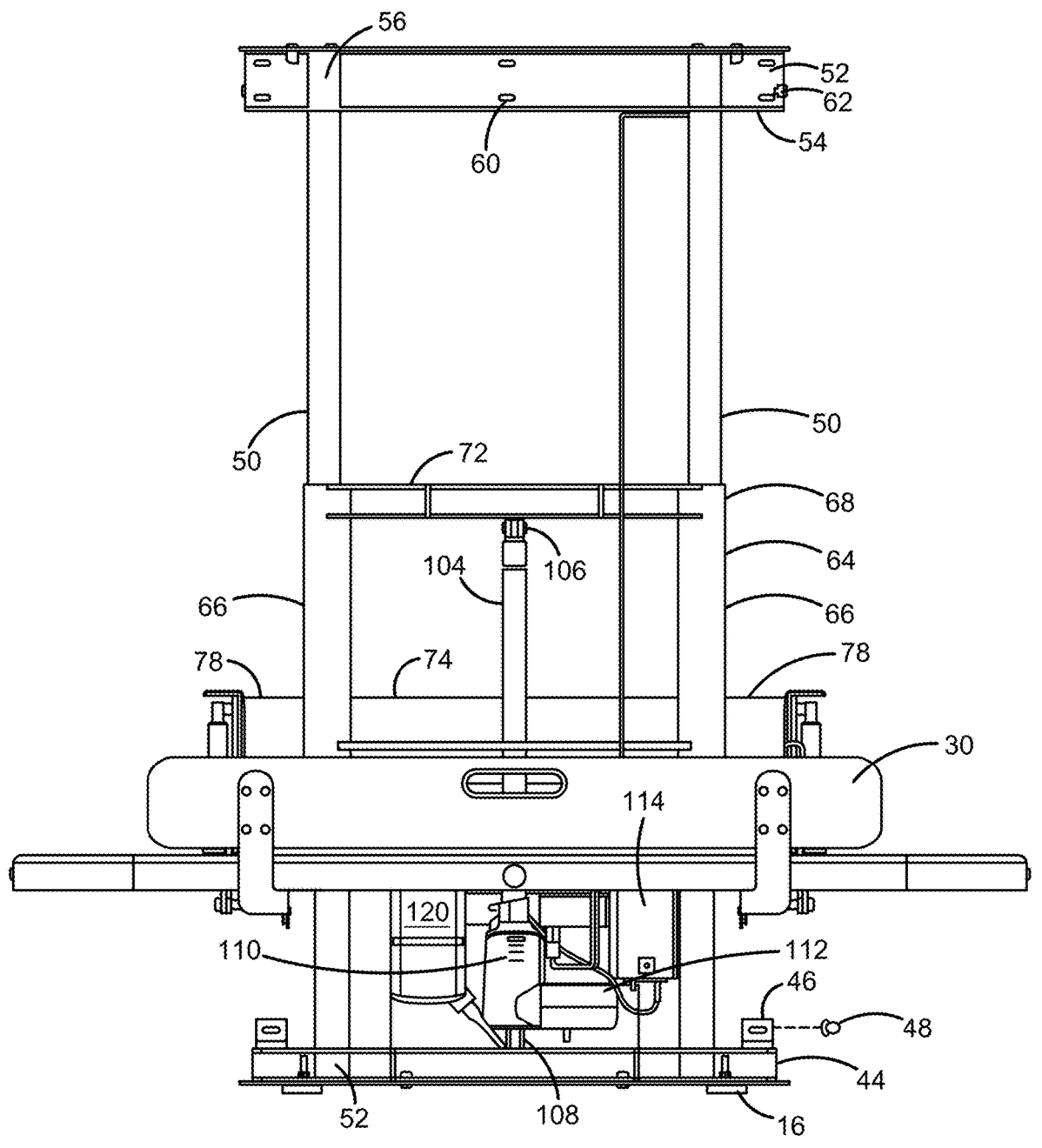
FIG. 13 is a view of the exemplary changing station corresponding to FIG. 12 but with the external covers removed so that the internal structures are visible.
Figure 14:
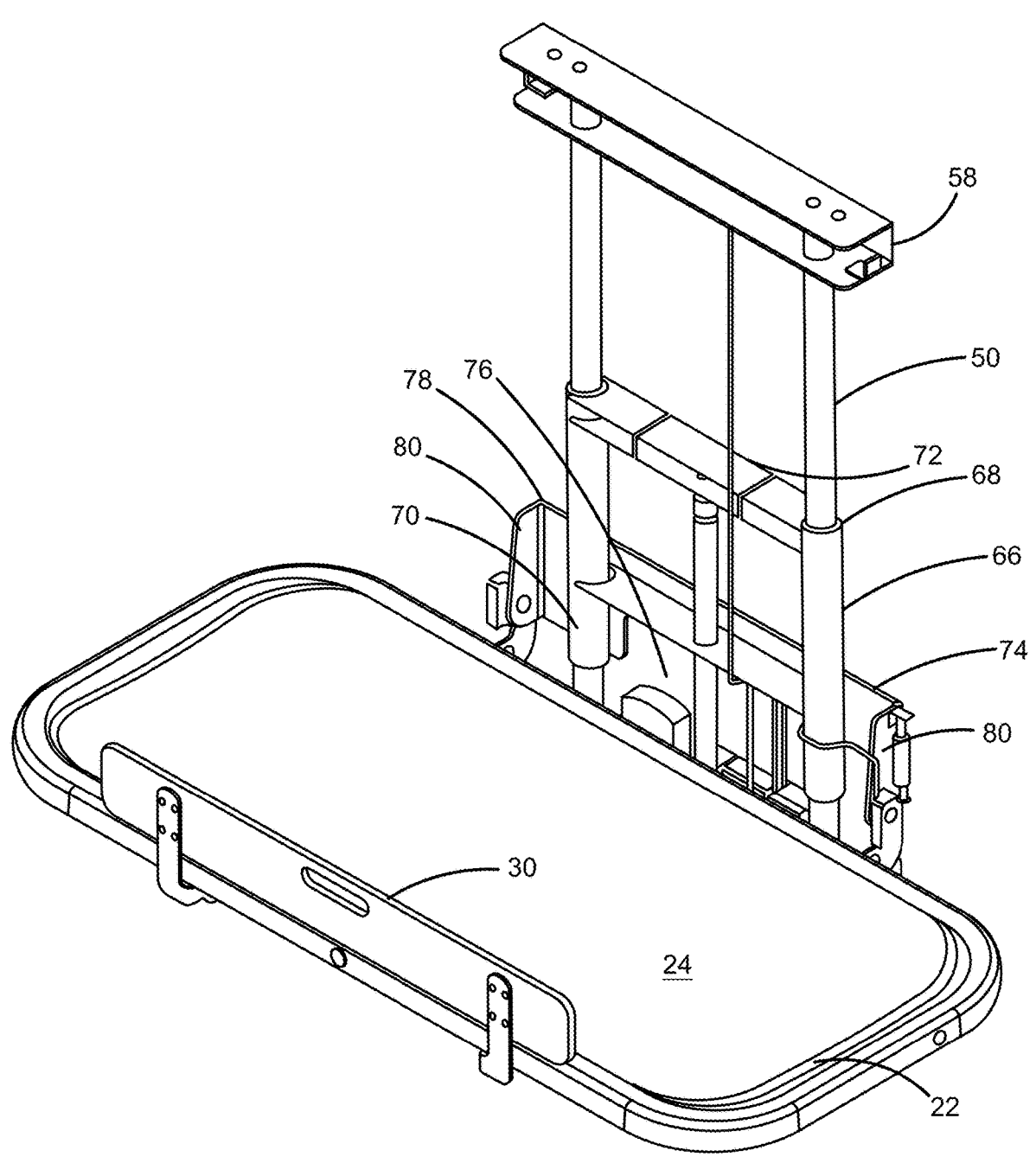
FIG. 14 is a top front left perspective view of the internal structures as shown in FIG. 13.
Figure 15:
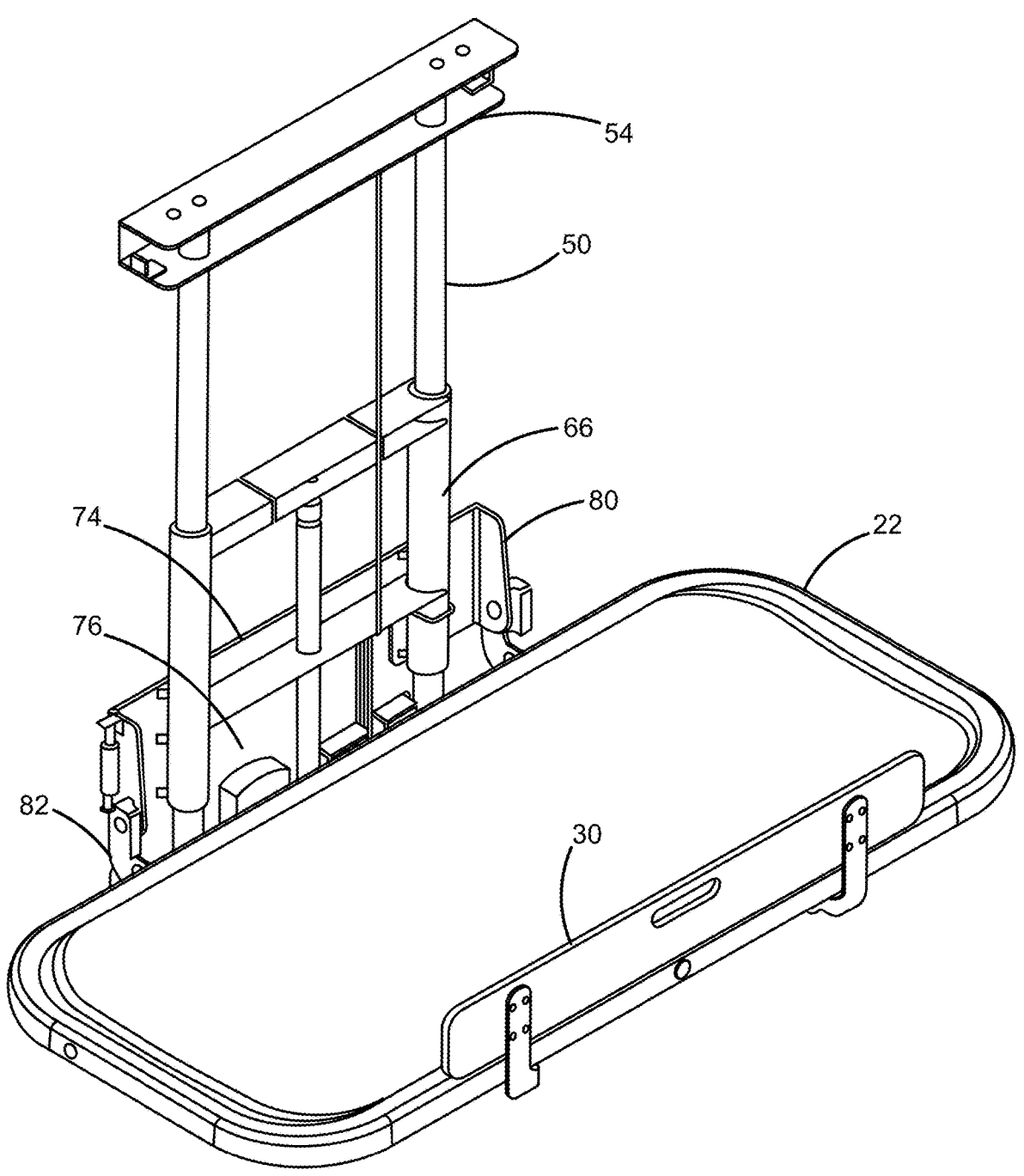
FIG. 15 is a top front right perspective view of the internal structures.
Figure 16:
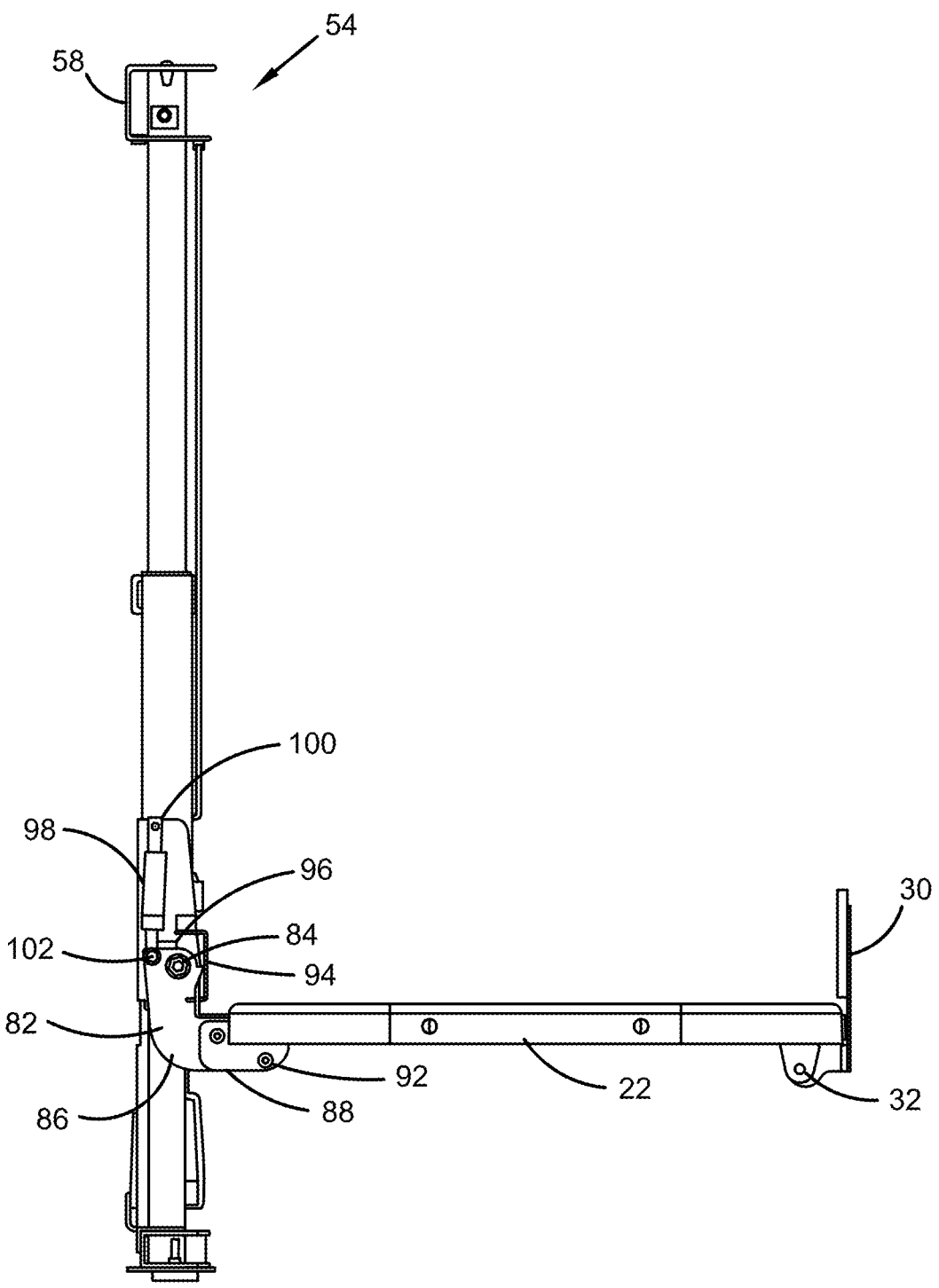
FIG. 16 is a right side view of the internal structures.
Figure 17:
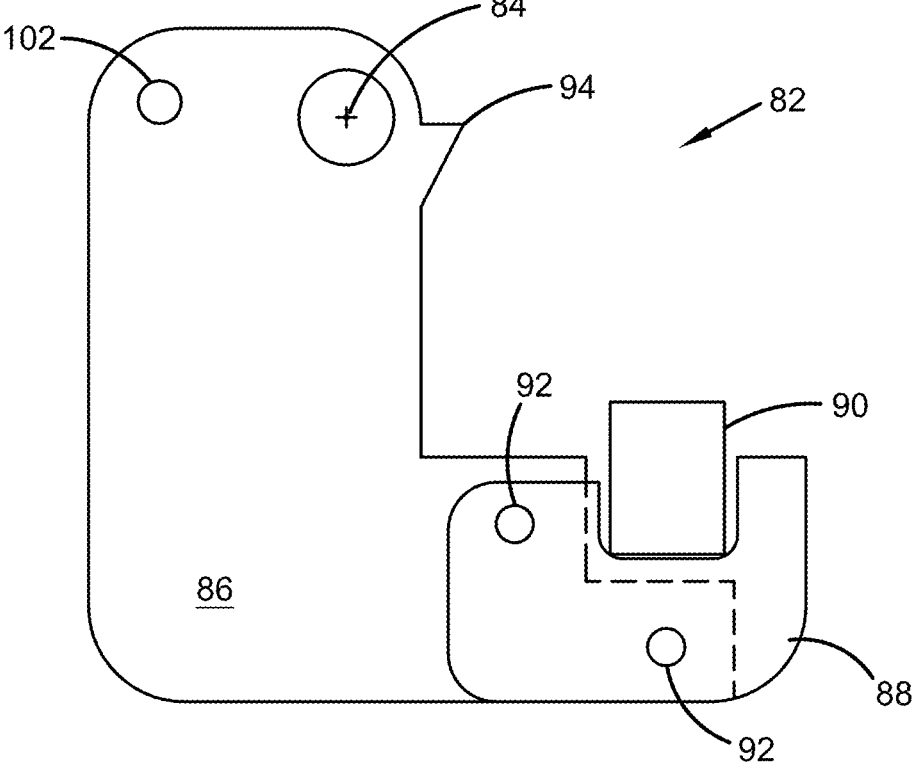
FIG. 17 is an enlarged view of a rotatable table supporting bracket.
Figure 18:
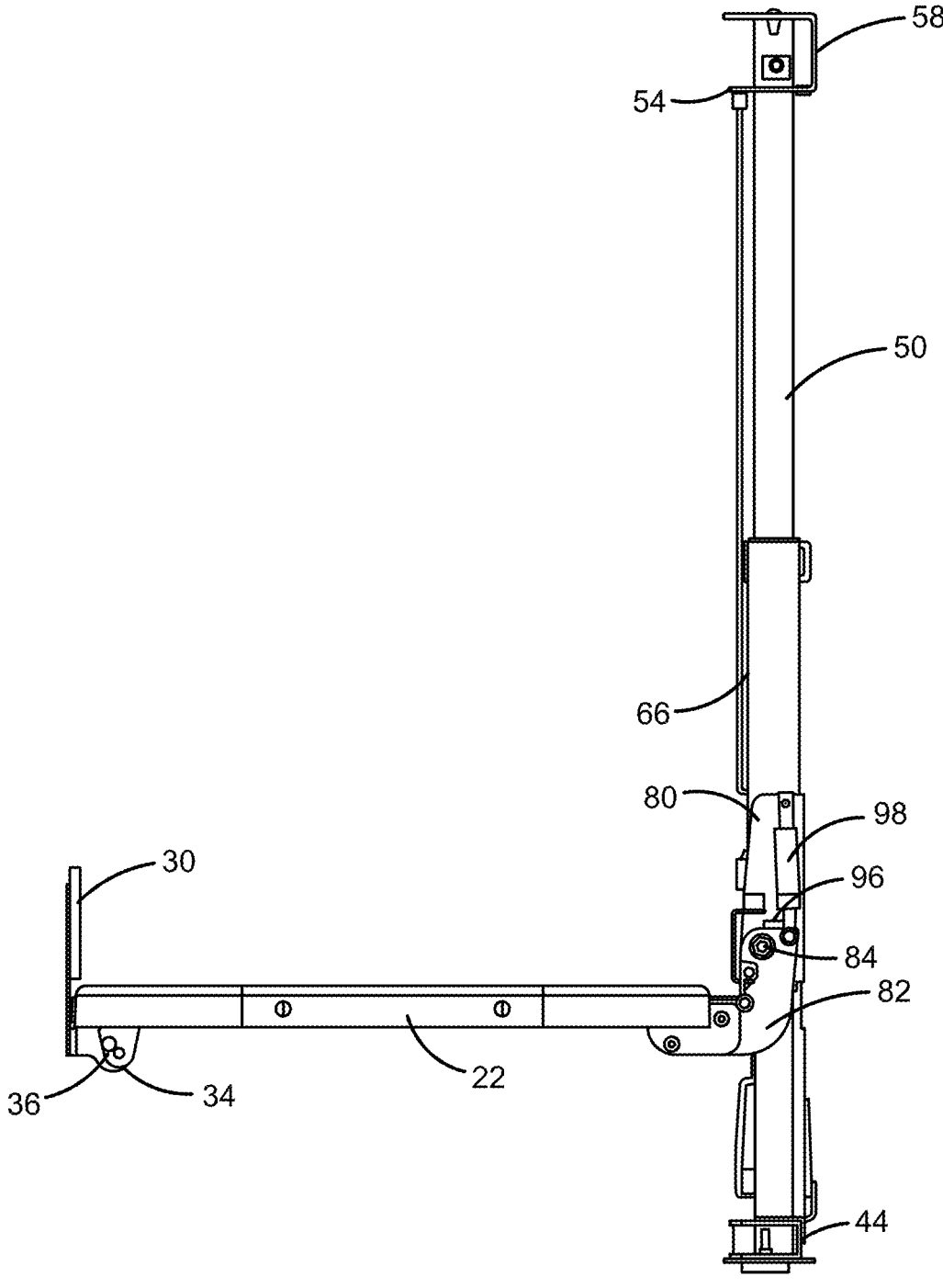
FIG. 18 is a left side view of the internal structures.
Figure 19:
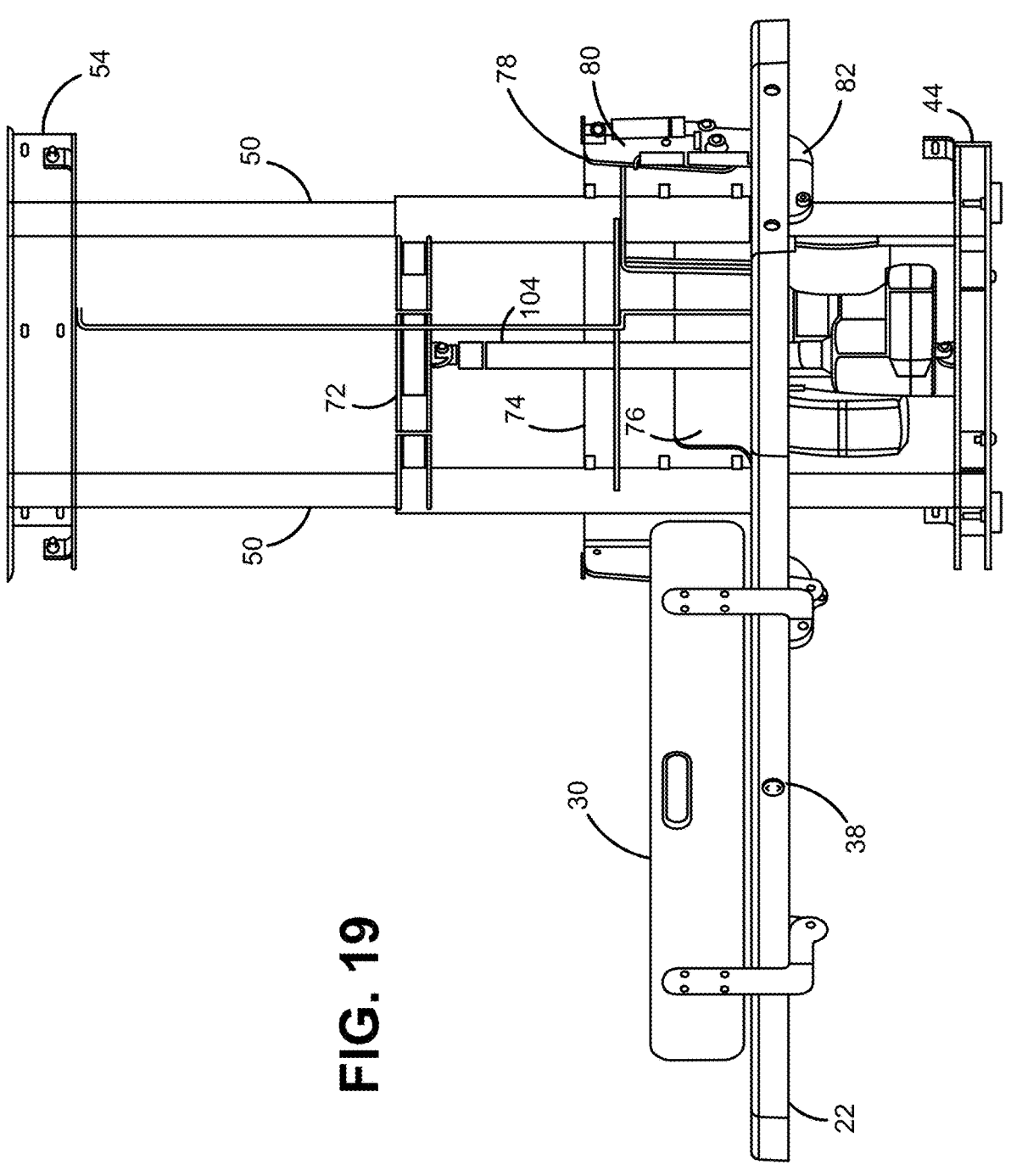
FIG. 19 is a front right perspective view of the internal structures.
Figure 20:
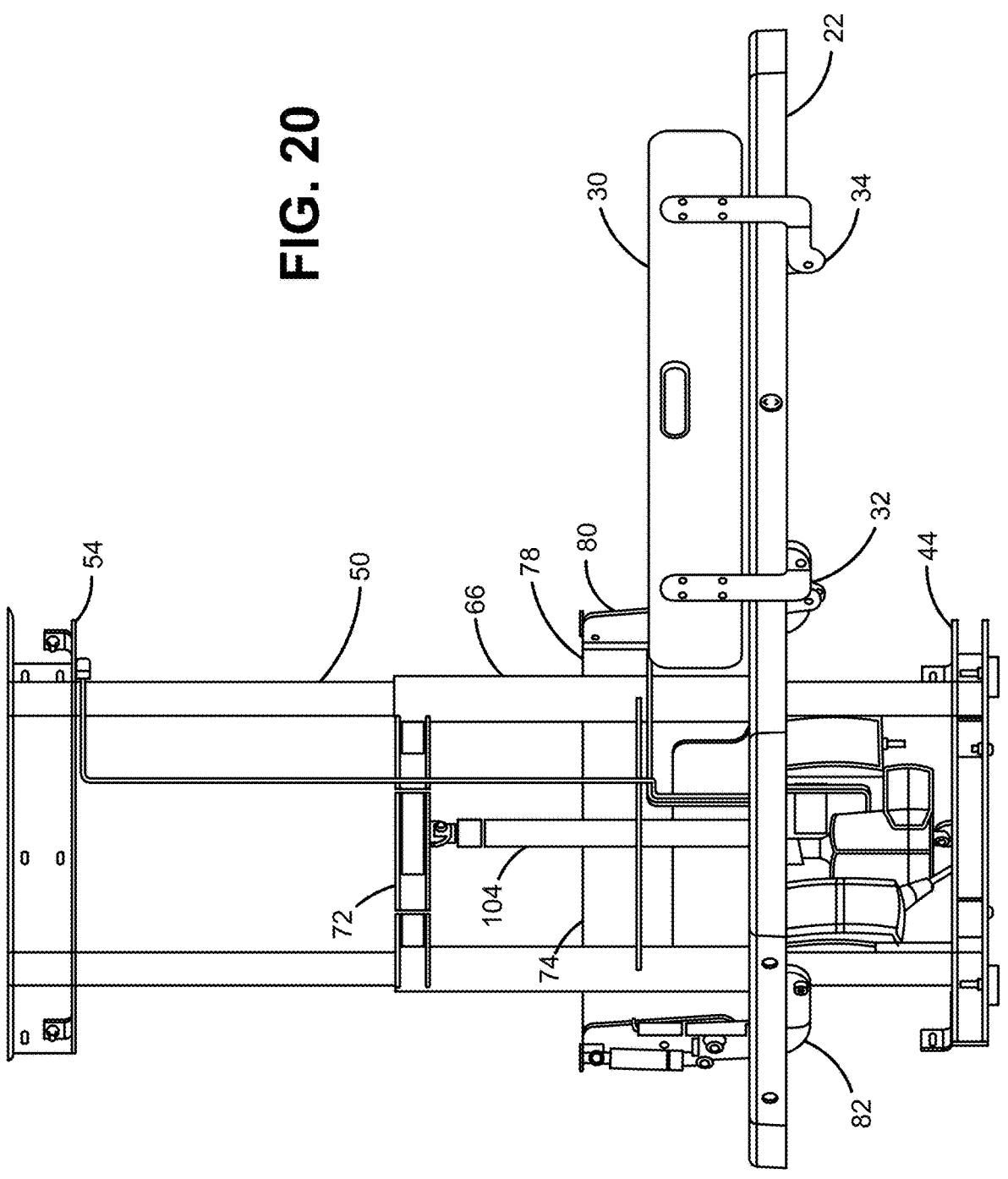
FIG. 20 is a front left perspective view of the internal structures.

The exemplary drive strut comprises a transmission including a rotatable feed screw 110 which is schematically represented in FIG. 13. An electric motor 112 is in operative connection with the drive strut. The exemplary drive strut is operative to extend in vertical length responsive to rotation of the motor 112 in a first rotational direction and to retract in vertical length responsive to rotation of the motor in a second rotational direction opposed of the first rotational direction. Of course this approach is exemplary and other arrangements other types of drive struts for selectively moving the carriage may be utilized. These may include drive struts of the screw drive type, drive struts that include hydraulic or pneumatic cylinders, drive struts that include electromagnetic actuators, drive struts that include worm gear type actuators and drive struts that include gear rack type actuators, for example.

In the exemplary arrangement the strut center of the drive strut 104 and the centers of the adjacent guide rods 50 are configured such that in horizontal transverse cross-section each of the rod centers and strut center extend in linearly aligned relation. This arrangement facilitates the ability of the drive strut to vertically move the carriage 64. The fact that in the exemplary arrangement the bottom member 74 of the carriage is disposed away from the center of the guide rods 50 by being attached to the carriage at the outer circumference of the guide sleeves 66 enables the drive strut 104 to extend vertically intermediate of the footer 44 and the top member 72. Further in the exemplary arrangement the central recess 76 in the bottom member 74 enables at least a portion of the transmission and motor assembly of the drive strut 104 to extend in the recess when the carriage is in the lowered position. This exemplary arrangement increases the range of motion over which the carriage can selectively travel while maintaining the necessary structural rigidity of the changing station. Of course it should be understood that this approach is exemplary and in other arrangements other approaches and configurations may be used.

Figure 21:
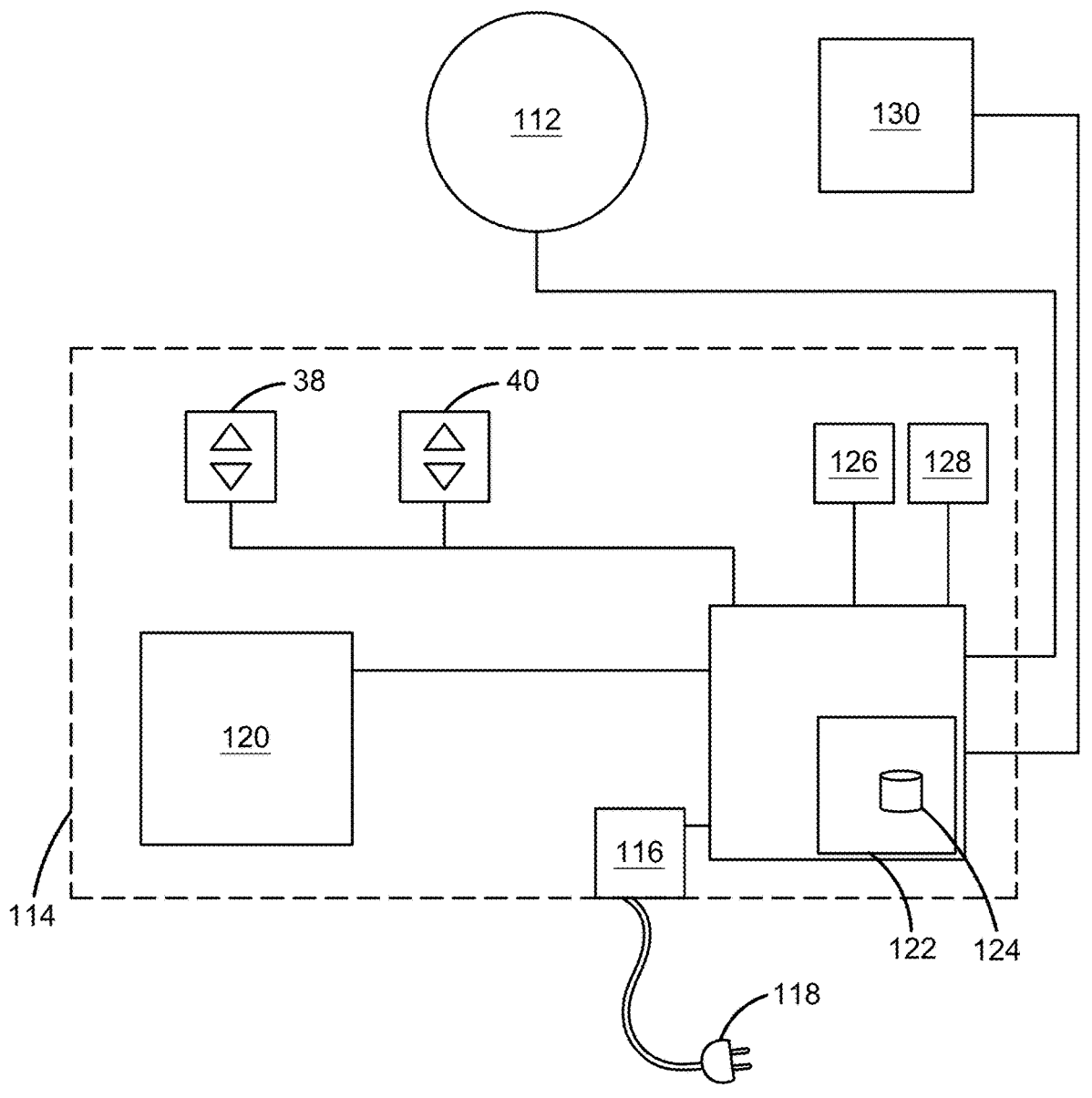
FIG. 21 is a schematic view of at least one exemplary control circuit of the changing station.

The exemplary arrangement further includes at least one control circuit 114 which is schematically represented in FIG. 21. The exemplary control circuit is operative to control the functions of the changing station and to provide convenience and safety features. In the exemplary arrangement the at least one control circuit includes the input devices 38 and 40 which have been previously discussed. The exemplary control circuit further includes an alternating current (AC) connector 116 that enables the changing station to be operated from household current such as by connection of the plug 118 to a source of household electrical current or other suitable power connector.

The exemplary control circuit further includes at least one rechargeable battery 120. The at least one rechargeable battery 120 provides an alternative power source for operation of the changing station in the event that power is unavailable from the AC connector. In the exemplary arrangement the control circuitry is also operative to charge the at least one battery 120 when power from the AC connector is available.

The exemplary at least one control circuit is operative to communicate electrical signals and control the operation of the electrical devices in the changing station. The at least one control circuit includes at least one processor schematically indicated 122 and at least one data store schematically indicated 124. In exemplary arrangements the processor may include a processor suitable for carrying out processor executable instructions that are stored in one or more associated data stores. The processor may include or be in operative connection with a non-volatile storage medium including instructions that include a basic input/output system (BIOS). For example processors may correspond to one or more or combination of a CPU, FPGA, ASIC or other integrated circuit or other circuit that is capable of processing data and instructions. The exemplary data stores may correspond to one or more of volatile or non-volatile memory such as random access memory, flash memory, magnetic memory, optical memory, solid state memory or other media that are operative to store processor executable instructions and data. The processor executable instructions may include instructions in any of a plurality of programming languages and formats including, without limitation, routines, subroutines, programs, threads of execution, scripts, objects, methodologies and functions which carry out the actions such as those described herein. Structures for processors may include, correspond to and utilize the principles described in the textbook titled Microprocessor Architecture, Programming and Applications with the 8085 by Ramesh S. Gaonker, Sixth Edition (Penram International Publishing 2013) which is incorporated herein by reference in its entirety.

The exemplary data stores used in connection with exemplary arrangements may include any one or more of several types of media suitable for holding non-transitory processor executable instructions. These may include for example magnetic media, optical media, solid state media or other types of media such as RAM, ROM, PROM, flash memory, computer hard drives or other form of media suitable for holding data and processor executable instructions. The exemplary control circuitry may also include other components such as hardware and/or software interfaces for communication with changing station devices and external devices and systems.

In the exemplary arrangement the control circuit further includes at least one wireless transceiver 126. The exemplary wireless transceiver may include a suitable device for communicating wireless signals and may include for example circuitry comprising a Bluetooth or Near Field Communication (NFC) transceiver. In other exemplary arrangements the transceiver may include a Wi-Fi transceiver or cellular transceiver. In some exemplary arrangements the wireless transceiver may be utilized to communicate signals with a smart phone or other mobile wireless device that are usable to control the operation of the changing station. This may include for example communication with an application that is installed on the user's smart phone that enables the user to raise and lower the carriage and the table responsive to inputs to the smart phone. This may be useful in some arrangements for persons who are in a wheelchair or who may not otherwise be able to readily manually contact the input devices 38 and 40.

Of course it should be understood that additional types of signals may be communicated through the exemplary at least one wireless transceiver. This may include for example information concerning ways in which the changing station may be operated. This may also include for example information on the current status of the components of the changing station and other information that may be useful to a user or other person. This may include for example a wireless beacon signal that may identify the type, location and/or availability of the changing station to the smart phones or other devices of potential users. Further in other exemplary arrangements the at least one wireless transceiver may be useful to provide information concerning operational status of the changing station. Such information may be communicated through a suitable Wi-Fi or cellular connection to a remote location so that malfunctions or other irregular conditions that might occur with regard to the operation of the changing station can be reported and corrected promptly. Of course numerous other features and capabilities may be provided in accordance with the programming of the at least one control circuit.

The exemplary at least one control circuit further includes at least one sensor schematically indicated 128. In exemplary arrangements the at least one sensor 128 may include for example suitable sensors such as switches or encoders that are operative to detect the position of the carriage relative to the guide rods. These may include sensors or encoders that are operative to determine whether the carriage has reached the upper or lower extremes of its travel. The exemplary sensors in some exemplary arrangements may include sensors that are operative to detect a speed and/or direction of movement of the exemplary carriage.

Other exemplary sensors may include sensors that are operative to determine the position of the safety barrier 30. In other exemplary arrangements sensors may be operative to detect other conditions such as the loading on the table 22 or loading that is applied on the brackets 82. Other sensors may detect a degree of tilt of the carriage and/or the table. Such sensors may be useful in determining possible overload conditions in which the table should not be operated.

Further exemplary sensors may include sensors that detect the current draw of the motor or other conditions that may be indicative of the resistance to movement of the carriage. Of course these sensors are exemplary and in other arrangements other approaches may be used.

The exemplary at least one control circuit 114 is further in operative connection with at least one output device schematically indicated 130. In exemplary arrangements the at least one output device may include visual output devices such as lights or other indicators that provide a user with an indication of conditions associated with the changing station. For example output devices may include illumination devices which indicate to the user that the changing station is operational and ready for use. Such illumination devices may include indicators or may also include devices which generally illuminate the area of the changing station. Alternatively output devices may include indicators that indicate that the changing station has malfunctioned and is currently not available for use. Other exemplary output devices may include audible output devices that provide outputs to indicate to a user certain conditions. These may include for example audible outputs that indicate that the carriage is currently moving. Such audible outputs may be useful in warning the user not to place items below the table 22 when the carriage is operating to move the table downward, for example. Of course numerous other types of audible indications may be provided through at least one output device.

Other exemplary output devices may include visual output devices such as a display screen. Such a display screen may be useful for purposes of providing the user with instructions or other information regarding the changing station. In some exemplary arrangements the visual output device may include a touchscreen interface through which a user can both receive outputs and provide inputs which are usable for controlling the functions of the changing station or to receive or provide other information. Further in some exemplary arrangements a touchscreen interface may be used to provide inputs that correspond to and result in a call for emergency assistance or to provide other notifications. Of course it should be understood that these approaches are exemplary and in other arrangements other approaches may be used.

As previously discussed, the exemplary control circuitry is operative to monitor for the availability of AC power through the AC connector 116. In the event that the at least one control circuit determines that AC power is not available, the at least one control circuit operates to cause at least some components of the changing station to be powered from the at least one rechargeable battery 120. This enables the user to complete currently ongoing changing activity with the changing station in the event of an AC power loss. Further in other exemplary arrangements auxiliary lights may be installed on or adjacent to the changing station so that the at least one control circuit can provide auxiliary lighting in the area of the changing station in the event that AC power has been lost. In some exemplary arrangements the at least one control circuit may operate to enable the completion of one or a limited set of activities using the power from the at least one rechargeable battery 120, and then may place the changing station out of service. Alternatively in other arrangements the changing station may operate using power from the at least one rechargeable battery until the level of available power from the at least one battery reaches the level that the at least one control circuit determines will no longer adequately operate the changing station and place the changing station out of service condition thereafter until AC power is restored. Further in exemplary arrangements the at least one control circuit may include a battery charger that is operated to maintain the at least one rechargeable battery in a fully charged condition when AC power has been available for an extended period.

The at least one control circuit of an exemplary arrangement is further operative to reduce the risk of causing injury or damage due to collisions of the table or other movable changing station components with individuals or other nearby items such as wheelchairs. In the exemplary arrangement the at least one control circuit is operative to sense the resistance to movement of the carriage and in situations where the resistance is determined to be above a threshold, to discontinue movement in the current direction. In addition in some exemplary arrangements the detection by the at least one control circuit that the resistance to movement has exceeded the threshold causes the at least one control circuit to operate to reverse the direction of movement of the table and the carriage so that the table moves away from an obstruction that it has encountered. In some exemplary arrangements the resistance to movement may be determined based on the electrical load on the motor which operates to move the drive strut and the carriage. Alternatively in other arrangements the resistance to movement may be based on sensors which detect loading on certain components of the changing station such as the brackets 82 which operatively connect the table and the carriage. In still other arrangements resistance to movement may be based on changes in speed at which the carriage moves. In other exemplary arrangements the resistance to movement may be based on sensing combination of these or other sensed factors.

Figure 28:
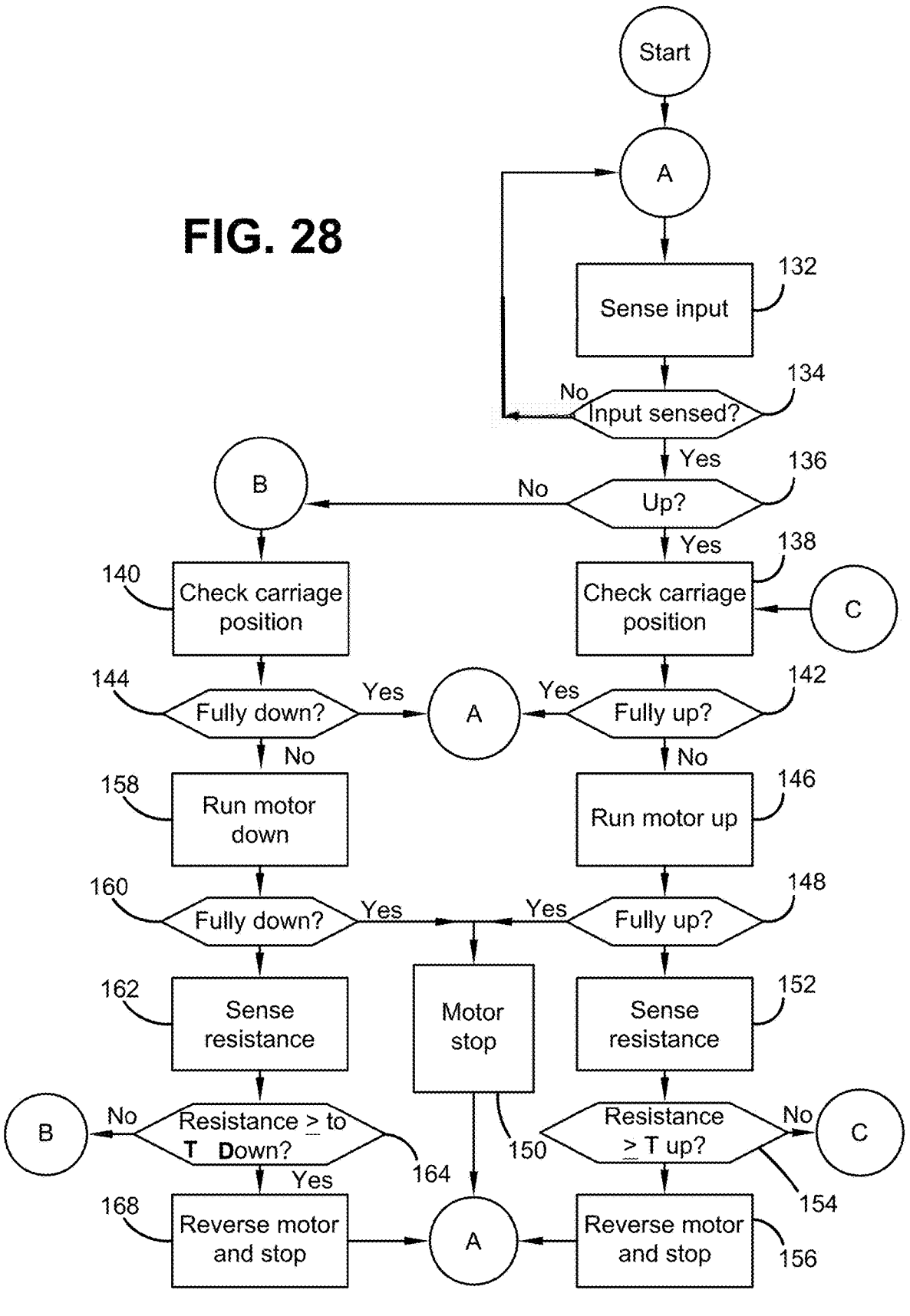
FIG. 28 is a schematic view of exemplary logic carried out by at least one control circuit of the changing station.

The exemplary logic carried out by the at least one control circuit in determining whether the sensed resistance to movement is above a threshold that may correspond to encountering an obstruction or other problematic condition is represented schematically in FIG. 28. In the exemplary arrangement the at least one control circuit is first operative to sense for an input from the user as represented by step 132. In exemplary arrangements this may include an input to move the table or carriage upward or downward through the input devices 38 or 40. In other exemplary arrangements the input to be sensed may be an input through the wireless transceiver 126, touchscreen or other input device.

In the exemplary arrangement when an input is detected as represented by step 134, a determination is made as represented in step 136 as to whether the input corresponds to a request to move the carriage and the table in connection therewith, in the up or down direction. In the event that the input corresponds to a request to move the carriage and table upward, a determination is made in a step 138 concerning the current position of the table and/or whether the table is already in the fully upward position. This may be based on the at least one control circuit checking the status of at least one sensor such as an encoder which is indicative of the current position of the carriage. Likewise if the input corresponds to a request to move the table downward, a determination is made in a step 140 on the current position of the table and/or whether the table is already in the fully down position.

If the input received corresponds to moving the table upward and the sensed position of the table in step 138 indicates that the table is already in the fully upward position as determined in a step 142, no further action is taken and logic returns to a standby condition. Likewise if the input received corresponds to moving the table downward and the sensed position of the table indicates that the table is already in the fully downward position as determined by a step 144, the logic returns it to the standby condition.

If the input corresponds to a request to move the table upward, and the table is not already in the fully upward position, the at least one control circuit operates the motor 112 to extend the drive strut 104 and cause the carriage and table to move upward as represented by step 146. A determination is made as represented by step 148 whether the table has been moved to the fully upward position. This is determined by the at least one control circuit receiving signals from one or more sensors or encoders. If the table has reached the fully upward position motor operation is stopped as represented by a step 150 and the logic returns to a standby condition awaiting further inputs.

As represented by step 152 while the at least one control circuit operates the motor to move the table upward the at least one control circuit is operative to sense at least one parameter corresponding to the resistance to movement of the table. As previously discussed the at least one parameter that is sensed in step 152 that corresponds to resistance to movement may correspond to the load on the motor, current speed or changes in speed of the carriage, sensed load on different components or other sensed parameters or combinations thereof.

As represented in a step 154, the at least one control circuit then determines if the resistance to movement is at or above a threshold for resistance to movement of the table in an upward direction. If in step 154 it is determined that the resistance to movement is at or above the threshold the least one control circuit operates to stop movement of the table in the upward direction. Further in the exemplary arrangement the at least one control circuit operates to reverse the direction of the motor and move the table and/or carriage away from an obstruction that has been encountered. This may correspond to moving the table in an opposed direction a set distance such as for example one inch. The at least one control circuit then stops further movement of the table until further inputs are received. This is represented by step 156. After executing instructions to cause the table and/or carriage to move away from the obstruction that has been encountered, the control logic returns to the standby condition.

Likewise in the exemplary arrangement where the received input corresponds to moving the table downward, from the step 144 the at least one control circuit operates to cause the motor to move the table in a downward direction as represented by step 158. As the motor moves downward the at least one control circuit operates to determine if the table has reached the fully downward position responsive to signals from one or more sensors such as an encoder. If the table has reached the fully downward position as determined in a step 160, the at least one control circuit causes the motor to stop as represented by step 150 and the control circuit returns to a standby condition.

As represented by step 162 while the control circuit operates to move the table downward the resistance to movement based on one or more parameters is determined. This may be done for example by sensing one or more parameters like those discussed in connection with determining the resistance to movement of the table in an upward direction. In a step 164 a determination is made concerning whether the resistance to movement is at or above a set threshold for downward movement of the table. In exemplary arrangements the threshold for resistance downward movement may be the same as or may be different than the threshold to resistance to upward movement. In the event that the resistance to downward movement is determined to be at or above the threshold, the at least one control circuit operates as represented in step 168 to stop the downward movement of the table. Further in the exemplary step 168 the at least one control circuit operates to reverse the direction of movement of the table and cause the table to move upward a set distance so that it is away from an obstruction that has been encountered. This may correspond to movement away from the obstruction a set distance such as for example 1 inch. Thereafter the control logic returns to a standby condition awaiting further inputs.

Of course it should be understood that in exemplary arrangements additional or different steps may be provided. This may include for example providing outputs indicative that the at least one circuit has determined that resistance to movement is above a threshold. This may include for example providing visual or audible outputs to the user. This may include for example providing an output indicative that the table is overloaded. Further in other exemplary arrangements additional features may be provided. These may include for example using proximity sensors to determine if a table or other location of the device is coming into close proximity with an obstruction. For example sensors such as inductance, magnetic, capacitance, ultrasonic or photosensor type sensors may be utilized to determine if a portion of the table or other component is within a set proximity of a potential obstruction. A determination of such proximity by at least one control circuit may cause the cessation of movement of the table and/or providing at least one output indicative to a user of the proximity of the table to an obstruction. Of course these approaches are exemplary and in other arrangements other approaches may be used.

The exemplary changing station may also include additional features and capabilities that facilitate the installation and operation of the changing station. These may include for example provision of one or more heaters included in the table to have the contact surface thereof be at a temperature that more closely corresponds to body temperature so as to provide added comfort. Other features may include for example repositories on or adjacent to the changing station that may include supplies such as wipes, diapers, hand sanitizer or other items that may facilitate use of the changing station. Other exemplary arrangements may include the incorporation of sanitary disposal containers or similar structures in the changing station. Other exemplary arrangements may include an emergency input device such as an alarm button that may be actuated to provide a signal to a remote location to indicate that a user is in need of emergency assistance at the changing station location. Of course these additional features are exemplary of other devices and features that may be included in exemplary arrangements.

Thus the exemplary arrangements achieve improved operation, eliminate difficulties encountered in the use of prior devices and systems, and attain the useful results that are described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples, and the new and useful features are not limited to the exact features that have been shown and described.

Having described the features, discoveries and principles of the exemplary arrangements, the manner in which they are constructed and operated, and the advantages and useful results attained; the new and useful features, devices, elements, arrangements, parts, combinations, systems, equipment, operations, methods, processes and relationships are set forth in the appended claims.

We claim:

1. Apparatus comprising:
height adjustable diaper changing station including
a footer, wherein the footer is configured
    to extend horizontally adjacent to an intersection of a horizontally extending floor and a vertically extending building wall,
    to be vertically supported through operative engagement with the floor,
    to be fixed in operative connection with at least one of the floor and the building wall through at least one first fastener,
a header, wherein the header is configured
    to extend horizontally adjacent to the building wall and in vertically overlying relation of the footer,
    to be fixed in operative connection with the building wall through at least one second fastener,
a pair of guide rods, wherein each guide rod
    extends vertically and in parallel horizontally spaced relation from the other guide rod of the pair, wherein the guide rods are horizontally spaced apart a guide space distance,
    includes a first guide rod end that is in fixed operative connection with the footer and a second guide rod end that is in fixed operative connection with the header,
a carriage, wherein the carriage is selectively vertically movable relative to the guide rods, wherein the carriage includes
    a pair of guide sleeves, wherein each guide sleeve
        extends in surrounding movable operatively engaged relation of a respective guide rod,
        is in operatively engaged relation with the respective guide rod over a vertical span distance that exceeds the guide space distance,
    a top member, wherein the top member
        extends horizontally, linearly, and intermediate of the guide sleeves, and
        is in fixed operative connection with each of the guide sleeves,
    a bottom member, wherein the bottom member
        extends horizontally,
        is positioned vertically below the top member,
        is in fixed operative connection with each of the guide sleeves,
a table, wherein the table
    includes a substantially planar changing surface,
    is movably rotatably mounted in operative connection with the carriage,
    wherein the table is rotatable between
        a use position in which the table extends substantially horizontally and outward in a direction normal to the wall and in which use position the changing surface faces substantially upward, and
        a stored position in which the changing surface extends substantially vertically and parallel to the building wall,
a drive strut, wherein the drive strut
    is selectively variable in length,
    extends vertically intermediate and in operative connection with each of the footer and the top member,
    is positioned in horizontally centered relation between the guide rods,
    wherein the changing table is selectively vertically positionable by varying the length of the drive strut.

2. The apparatus according to claim 1
wherein each guide sleeve includes a top end and a bottom end,
wherein the top member is in fixed connection with the respective top end of each guide sleeve, and
wherein the bottom member is in fixed connection with the respective bottom end of each guide sleeve.

3. The apparatus according to claim 1
wherein in transverse cross-section a rod center of each guide rod and a strut center of the drive strut are linearly aligned.

4. The apparatus according to claim 1
wherein the bottom member includes a pair of opposed horizontally transverse member sides, wherein each transverse member side extends horizontally outward beyond the respective immediately horizontally adjacent guide sleeve,
wherein each transverse member side includes a mounting arm, wherein each mounting arm extends normal of the building wall,
wherein the table is movably operatively attached to each mounting arm.

5. The apparatus according to claim 1
wherein the bottom member includes a pair of opposed horizontally transverse member sides, wherein each transverse member side extends horizontally outward beyond the respective immediately horizontally adjacent guide sleeve,
wherein each transverse member side includes a mounting arm, wherein each mounting arm extends normal of the building wall,
a pair of brackets, wherein each respective mounting arm is in rotatably attached connection with a respective bracket, wherein each bracket is rotatable relative to the respective mounting arm about a respective pivot,
a pair of springs, wherein one respective spring is operatively attached to a respective bracket on a first radial side of a respective pivot and the table is operatively attached to the respective bracket on second radial side of the respective pivot opposed of the first side, wherein the table is biased by the respective spring toward the stored position.

6. The apparatus according to claim 1
wherein the bottom member includes a pair of opposed horizontally transverse member sides, wherein each transverse member side extends horizontally outward beyond the respective immediately horizontally adjacent guide sleeve,
wherein each transverse member side includes a mounting arm, wherein each mounting arm extends normal of the building wall, a pair of J shape brackets, wherein each respective mounting arm is in rotatably attached connection with a respective J shape bracket, wherein each J shape bracket is rotatable relative to the respective mounting arm about a respective pivot, and extends vertically below the table when the table is in the use position, a pair of springs, wherein one respective spring is operatively attached to a respective J shape bracket on a first radial side of a respective pivot and the table is operatively attached to the respective J shape bracket on second radial side of the respective pivot opposed of the first side, wherein the table is biased by the respective spring toward the stored position.

7. The apparatus according to claim 1
wherein the bottom member includes a pair of opposed horizontally transverse member sides, wherein each transverse member side extends horizontally outward beyond the respective immediately horizontally adjacent guide sleeve, wherein each transverse member side includes a mounting arm, wherein each mounting arm extends normal of the building wall, a pair of J shape brackets, wherein each respective mounting arm is in rotatably attached connection with a respective J shape bracket, wherein each J shape bracket is rotatable relative to the respective mounting arm about a respective pivot, and includes a separable base portion and distal portion, wherein the pivot extends on the base portion and the distal portion extends vertically below the table when the table is in the use position, wherein the distal portion is in fixed connection with the table, a pair of springs, wherein one respective spring is operatively attached to a respective J shape bracket on a first radial side of a respective pivot and the table is operatively attached to the respective J shape bracket on a second radial side of the respective pivot opposed of the first side, wherein the table is biased by the respective spring toward the stored position.

8. The apparatus according to claim 1
wherein the footer includes a pair of horizontally disposed leveling feet, wherein each leveling foot is configured to be engaged with the floor, and is selectively vertically positionable relative to the footer.

9. The apparatus according to claim 1
wherein the bottom member is attached at an outer circumference of each of the guide sleeves, whereby the bottom member is horizontally disposed from the drive strut.

10. The apparatus according to claim 1
wherein the header comprises a C-shaped channel including a back channel wall, wherein the back channel wall is configured to be fixed in abutting relation with the building wall by the at least one second fastener.

11. The apparatus according to claim 1
wherein the header comprises a C-shaped channel including a back channel wall, wherein the back channel wall is configured to be fixed in abutting relation with the building wall, extends horizontally beyond each of the guide rods, includes a plurality of fastener accepting openings therethrough, wherein the back channel wall is configured to be held in abutting engagement with the building wall by respective second fasteners extending through a respective fastener accepting openings.

12. The apparatus according to claim 1 and further including a safety barrier, wherein the safety barrier is movably mounted in operative connection with the table, wherein the safety barrier is selectively manually movable to extend above the changing surface of the table when the table is in the use position.

13. The apparatus according to claim 1 and further including a safety barrier, wherein the safety barrier is manually rotatably movably mounted in operative connection with the table, wherein the safety barrier is selectively manually rotatably movable to extend above or be below the changing surface of the table when the table is in the use position.

14. The apparatus according to claim 1 and further including a safety barrier, wherein the safety barrier is manually rotatably movably mounted in operative connection with the table, wherein the safety barrier is selectively manually rotatably movable to be in an extended position such that the barrier extends above the changing surface or in a retracted position in which the barrier is below the changing surface when the table is in the use position, at least one detent, wherein the at least one detent is operative to releasably hold the safety barrier in at least one of the extended position and the retracted position.

15. The apparatus according to claim 1
wherein the drive strut includes a feed screw, and a motor in operative connection with the feed screw, wherein the motor is operative to selectively rotate the feed screw, wherein the rotation of the feed screw by the motor is selectively operative to cause the table to be raised and lowered.

16. The apparatus according to claim 1
wherein the bottom member includes a vertically extending central recess, wherein the drive strut includes a feed screw, and a motor in operative connection with the feed screw, wherein the motor is operative to selectively rotate the feed screw, wherein the rotation of the feed screw by the motor is selectively operative to cause the table to be raised and lowered, wherein in a lowered position of the table the motor extends in the central recess.

17. The apparatus according to claim 1
and further including an electric motor, wherein the electric motor is in operative connection with the drive strut, wherein operation of the motor is selectively operative to cause the table to be raised and lowered, at least one control circuit, wherein the at least one control circuit

17 is in operative connection with the motor,
includes at least one rechargeable battery, and
includes an alternating current (AC) connector,
wherein the at least one control circuit is operative to
cause motor operation using power from the at least
one rechargeable battery when power is unavailable
through the AC connector.
18. The apparatus according to claim 1
wherein the changing station further includes
a stationary outer cover, and
an electric motor,
wherein the electric motor is in operative connection
with the drive strut,
wherein operation of the motor is selectively operative to cause the table to be raised and lowered,
at least one control circuit, wherein the at least one
control circuit
is in operative connection with the motor,
includes at least one input device in attached connection with the table, and at least one further
input device in operative connection with the
stationary outer cover,
wherein the at least one control circuit is selectively
operative to cause the table to be raised and
lowered responsive to inputs through the at least
one input device and the at least one further input
device.
19. The apparatus according to claim 1
wherein the changing station further includes
an electric motor,
wherein the electric motor is in operative connection
with the drive strut,
wherein operation of the motor is selectively operative to cause the table to be raised and lowered,
at least one control circuit, wherein the at least one
control circuit
is in operative connection with the motor,
includes at least one manual input device in attached
connection with the changing station, and
at least one wireless transceiver,
wherein the at least one control circuit is selectively
operative to cause the table to be raised and
lowered responsive to manual inputs through the
at least one manual input device and wireless
signals received through the at least one wireless
transceiver.
20. The apparatus according to claim 1
wherein the changing station further includes
an electric motor,
wherein the electric motor is in operative connection
with the drive strut,
wherein operation of the motor is selectively opera-
tive to cause the table to be raised and lowered,
at least one control circuit, wherein the at least one
control circuit
is in operative connection with the motor,
includes at least one manual input device in attached
connection with the changing station,
wherein the at least one control circuit is selectively
operative to cause the table to move upward and
downward responsive to manual inputs through
the at least one manual input device,
wherein the at least one control circuit is operative to
determine that a level of resistance to at least one of
upward or downward table movement is above a threshold, and to cause at least one of movement to
stop or a reversal in movement direction responsive
to the determination.
21. Apparatus comprising:
a height adjustable diaper changing station including
a footer configured to be in supported connection with a
horizontal floor and positioned adjacent to a vertically
extending building wall,
wherein the footer is configured to be held in attached
engagement with at least one of the floor and build-
ing wall through at least one lower fastener,
a header configured to be positioned vertically above the
footer and to be held in attached engagement with the
building wall through at least one upper fastener,
a pair of guide rods, wherein the guide rods
extend in parallel horizontally spaced relation and
vertically intermediate of the header and the footer,
wherein each of the header and the footer extend
horizontally outward beyond each guide rod on each
respective lateral side,
a carriage, wherein the carriage includes
a pair of guide sleeves, wherein each of the guide
sleeves
extends in movable operatively engaged relation
with a respective guide rod,
a top member, wherein the top member extends hori-
zontally, linearly, and is in fixed operative engage-
ment with a top portion of each of the guide sleeves,
a bottom member, wherein the bottom member extends
horizontally and in fixed operative engagement with
a bottom portion of each of the guide sleeves,
a drive strut, wherein the drive strut
is selectively variable in length,
extends vertically intermediate of and in attached
operative connection with the footer and at least one
of the top member and the bottom member,
extends horizontally intermediate of the guide sleeves,
a table, wherein the table
includes a substantially planar changing surface,
is movably mounted in operative connection with the
carriage, wherein the table is rotatable between
a use position in which the table extends substan-
tially horizontally and outward in a direction nor-
mal to the wall and in which use position the
changing surface faces substantially upward, and
a stored position in which the changing surface
extends substantially vertically and parallel to the
building wall.
22. The apparatus according to claim 21
wherein each guide sleeve extends
in surrounding movable operatively engaged relation
with the respective guide rod, and
is in operatively engaged relation with the respective
guide rod over a vertical span distance that exceeds
the distance between the guide rods.
23. The apparatus according to claim 22
wherein the bottom member includes a pair of horizon-
tally disposed mounting arms,
wherein each mounting arm
extends horizontally outward away from the immedi-
ately adjacent guide sleeve, and extends normal of
the building wall,
wherein the changing station further includes a pair of J
shape mounting brackets,
wherein each J shape mounting bracket
is in operative rotatable connection with a respective
mounting arm through a respective pivot, includes a distal portion, wherein the distal portion is in fixed connection with the table and extends below the changing surface when the table is in the use position.

24. The apparatus according to claim 22 wherein the bottom member includes a pair of horizontally disposed mounting arms, wherein each mounting arm extends horizontally outward away from the immediately adjacent guide sleeve, and extends normal of the building wall, wherein the changing station further includes a pair of J shape mounting brackets, wherein each J shape mounting bracket is in operative rotatable connection with a respective mounting arm through a respective pivot, includes a distal portion and a base portion, wherein the pivot extends on the base portion, and wherein the distal portion is releasably fixed connection with the base portion, is in fixed operative connection with the table, and extends below the table when the table is in the use position.

25. The apparatus according to claim 22 wherein the header comprises a C-shape channel including a back channel wall, wherein the back channel wall includes a plurality of fastener accepting openings, wherein the back channel wall is fixed in abutting engagement with the building wall through respective fasteners extending through the fastener accepting openings.

26. The apparatus according to claim 22 wherein in transverse cross-section each of the guide rods includes a respective rod center, and the drive strut includes a respective strut center, wherein each of the rod centers and the strut center are linearly aligned.

27. The apparatus according to claim 22 wherein the drive strut is in operative connection with a motor, wherein operation of the motor is selectively operative to increase and decrease the length of the drive strut, wherein the bottom member includes a vertically extending central recess, wherein the motor extends in the vertically extending central recess.

28. The apparatus according to claim 22 wherein the drive strut is in operative connection with a motor, wherein operation of the motor is selectively operative the increase and decrease the length of the drive strut, at least one control circuit, wherein the at least one control circuit is in operative connection with the motor, includes at least one rechargeable battery, and includes at least one alternating current (AC) connector, wherein the at least one control circuit is operative to cause the motor to operate responsive to power from the at least one rechargeable battery when power from the AC connector is unavailable.

\*   \*   \*   \*   \*